(12) United States Patent
Seymour et al.

(10) Patent No.: US 9,577,454 B2
(45) Date of Patent: Feb. 21, 2017

(54) SERIES CONNECTED STORAGE INTERFACE CONVERTER

(71) Applicant: Primus Power Corporation, Hayward, CA (US)

(72) Inventors: Eric Seymour, Fort Collins, CO (US); Jonathan Hall, San Mateo, CA (US); Ryan Larsen, San Francisco, CA (US)

(73) Assignee: PRIMUS POWER CORPORATION, Hayward, CA (US)

( * ) Notice: Subject to any disclaimer, the term of this patent is extended or adjusted under 35 U.S.C. 154(b) by 174 days.

(21) Appl. No.: 14/250,939

(22) Filed: Apr. 11, 2014

(65) Prior Publication Data
US 2015/0295442 A1 Oct. 15, 2015

(51) Int. Cl.
H02J 7/00 (2006.01)
H02J 3/32 (2006.01)
H02J 13/00 (2006.01)

(52) U.S. Cl.
CPC ............... *H02J 7/0052* (2013.01); *H02J 3/32* (2013.01); *H02J 7/0013* (2013.01); *H02J 13/0079* (2013.01)

(58) Field of Classification Search
CPC ............. H02J 7/00; H02J 3/32; H02J 13/0079
USPC .................. 320/116, 129, 135, 166
See application file for complete search history.

(56) References Cited

U.S. PATENT DOCUMENTS 8,861,238 B2 * 10/2014 Huang ........................... 363/127
9,413,185 B2 * 8/2016 Kim ........................ H02J 7/007
2004/0062059 A1 * 4/2004 Cheng ................. B60L 11/1814
  363/17
2013/0051102 A1 * 2/2013 Huang ................... H02M 7/217
  363/127
2013/0127396 A1 5/2013 Triebel et al.
2013/0285459 A1 * 10/2013 Jaoui ......................... H02J 3/32
  307/80
2013/0307479 A1 * 11/2013 Kim ......................... H02J 7/007
  320/112
2014/0028249 A1 * 1/2014 Larsen .................... H02J 7/022
  320/107
2014/0211529 A1 * 7/2014 Kandasamy .......... H02M 7/797
  363/131

FOREIGN PATENT DOCUMENTS

JP 2001292532 A 10/2001
KR 1020130085203 A 7/2013

OTHER PUBLICATIONS

Notification of Transmittal of the International Search Report and Written Opinion of the International Searching Authority for PCT/US2015/025245, dated Jul. 20, 2015, 13 pages.

(Continued)

*Primary Examiner* — Phallaka Kik
(74) *Attorney, Agent, or Firm* — The Marbury Law Group PLLC

(57) ABSTRACT

A method for operating a plurality of energy storage devices includes controlling operation of the plurality of energy storage devices connected in series by independently varying a current and/or bypassing and/or reversing a polarity of at least one of the plurality of energy storage devices without a corresponding change in current, bypass, or reversal of polarity of one or more of the other energy storage devices connected in series.

19 Claims, 14 Drawing Sheets

(56) References Cited

OTHER PUBLICATIONS

Notification of Transmittal of the International Preliminary Report on Patentability and Written Opinion of the International Searching Authority for PCT/US2015/025245, dated Oct. 20, 2016, 10 pages.

* cited by examiner

US 9,577,454 B2

1

SERIES CONNECTED STORAGE INTERFACE CONVERTER

FIELD

The present invention is directed to electrochemical systems, such as flow batteries, and methods of using same.

BACKGROUND

Electrical energy storage in the form of chemical batteries often expresses a wide range of voltage as a function of chosen chemistry, charge/discharge current and state of charge. While the simplicity of a power grid-tie inverter connected directly to battery cells stacked in some arrangement may be attractive, battery voltage characteristics often make this difficult

SUMMARY

Aspect methods and apparatuses for controlling charging and discharging of a plurality of energy storage devices electrically connected in series. Aspects may include a central power converter connected to the plurality of energy storage devices electrically connected in series via a single inductor. Aspects may include a central or dispersed controller for controlling switch devices electrically connecting the plurality of energy storage devices to each other and to the central power converter.

In one embodiment, a method for operating a plurality of energy storage devices includes controlling operation of the plurality of energy storage devices connected in series by independently varying a current and/or bypassing and/or reversing a polarity of at least one of the plurality of energy storage devices without a corresponding change in current, bypass, or reversal of polarity of one or more of the other energy storage devices connected in series.

In another embodiment, a circuit comprises a plurality of switch devices configured to provide for bi-directional flow of a current, wherein each switch device of the plurality of switch devices is electrically connected to at least one other one of the plurality of switch devices in series. The circuit also comprises a plurality of energy storage devices, wherein each energy storage device of the plurality of energy storage devices is electrically connected to at least one of the switch devices such that each energy storage device is electrically connected to at least one of the plurality of energy storage devices in series via at least one of the switch device. The circuit also comprises a power converter electrically connected between a power grid connector and each end of a series of the plurality of switch devices electrically, where the power converter is configured to provide for bi-directional flow of the current, and an inductor electrically connected in series between a first end of the series of the plurality of switch devices and a first input/output of the power converter.

2

Figure 2:
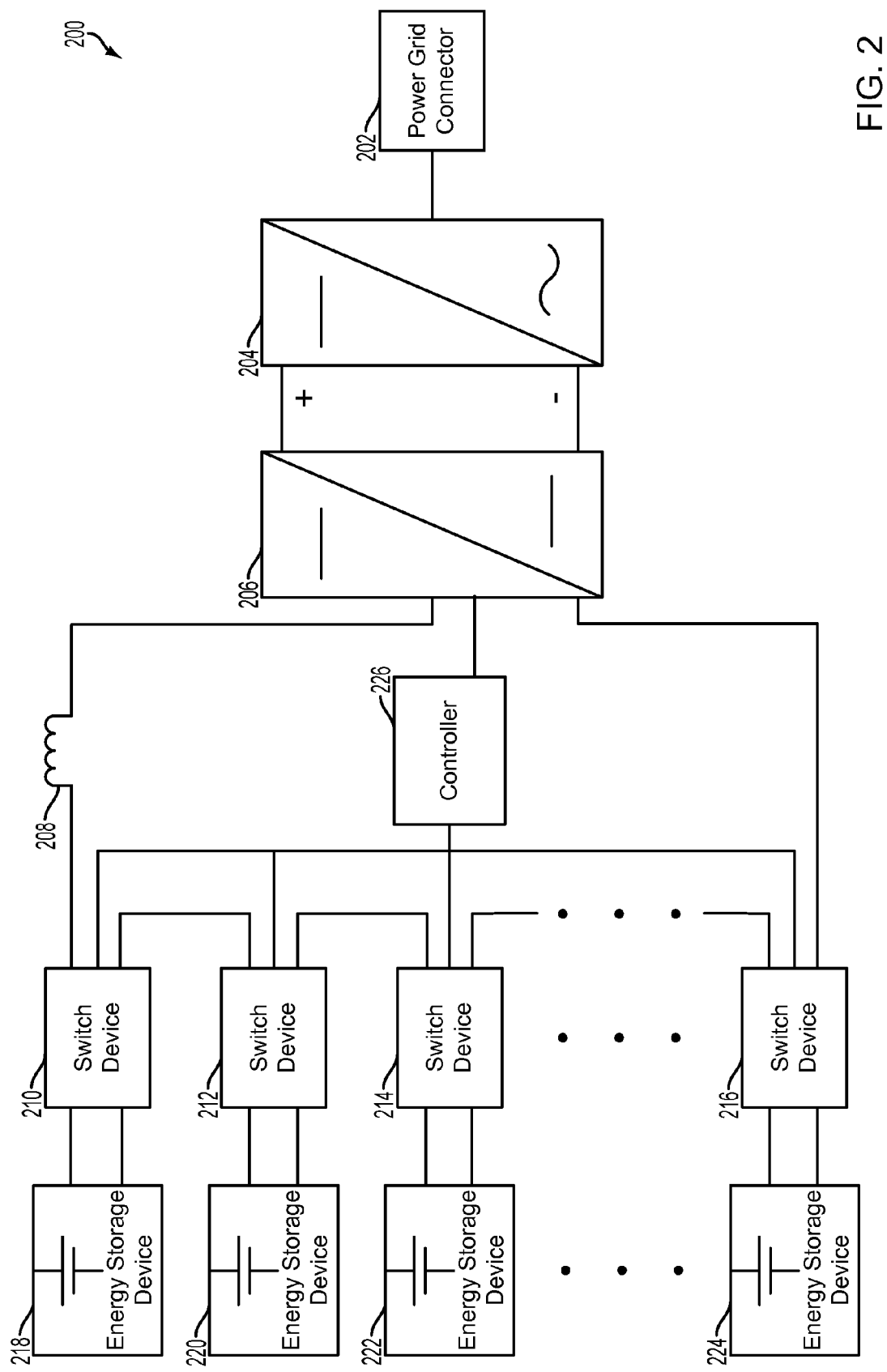
FIG. 2 illustrates a schematic diagram of an energy storage and dispensation circuit having a plurality of energy storage devices connected in series and connected to a central power converter via a single inductor according to an aspect.

FIGS. 3-11 illustrate aspect states and operations of the circuit of FIG. 2.

Figure 12:
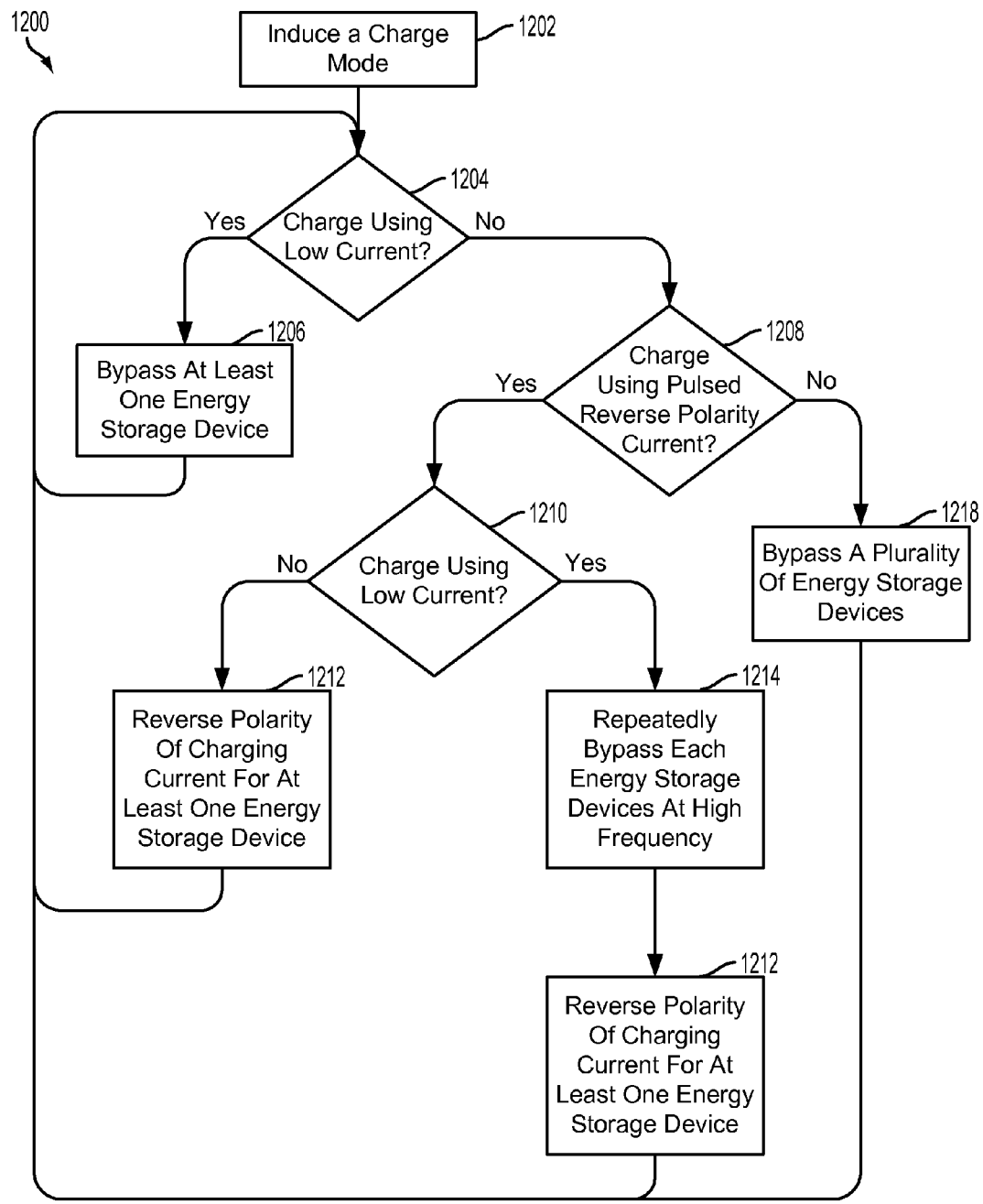

FIG. 12 illustrates a process flow diagram of an aspect method for operating a plurality of energy storage devices in a charge mode.

Figure 13:
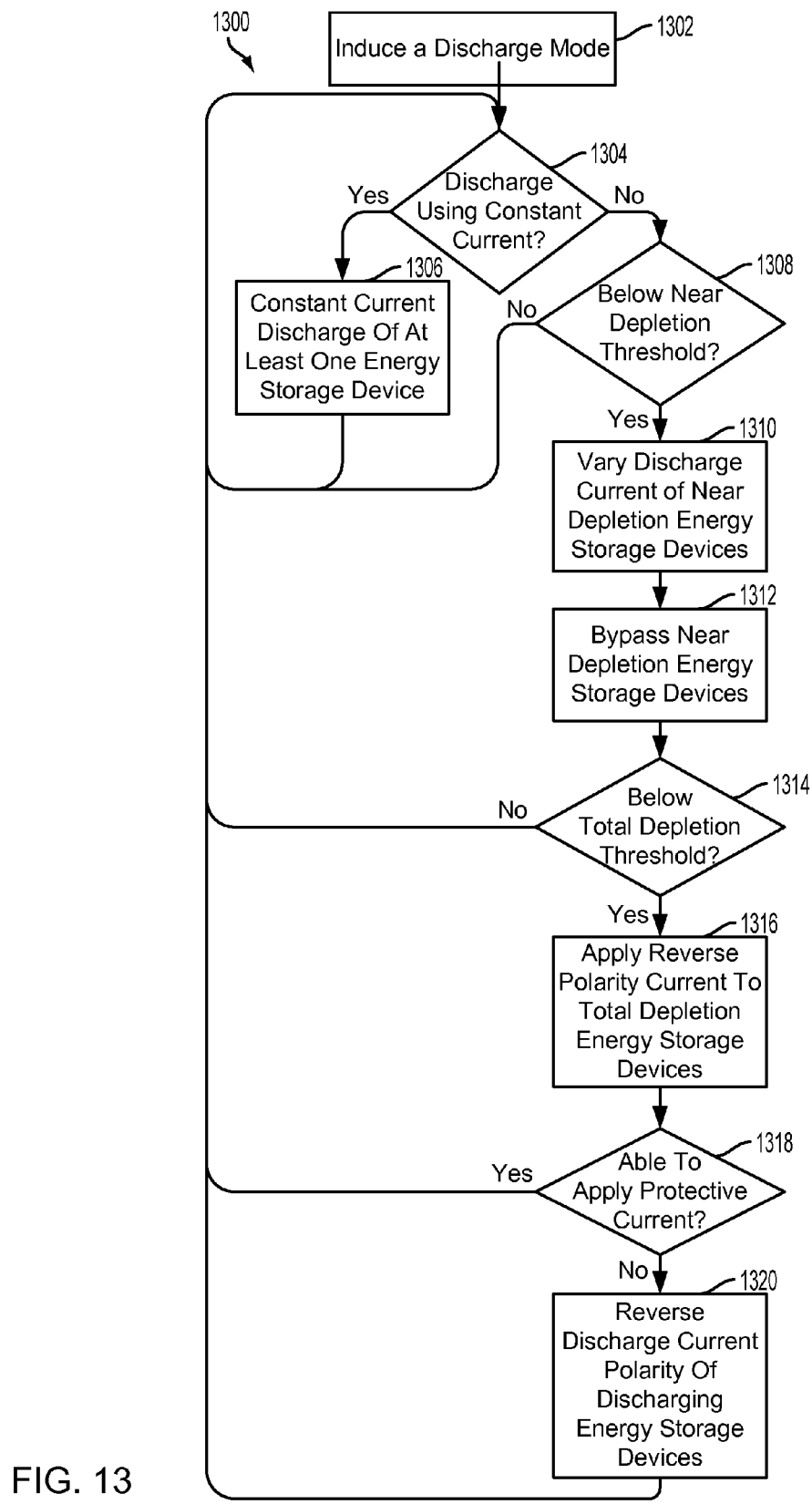

FIG. 13 illustrates a process flow diagram of an aspect method for operating a plurality of energy storage devices in a discharge mode.

Figure 14:
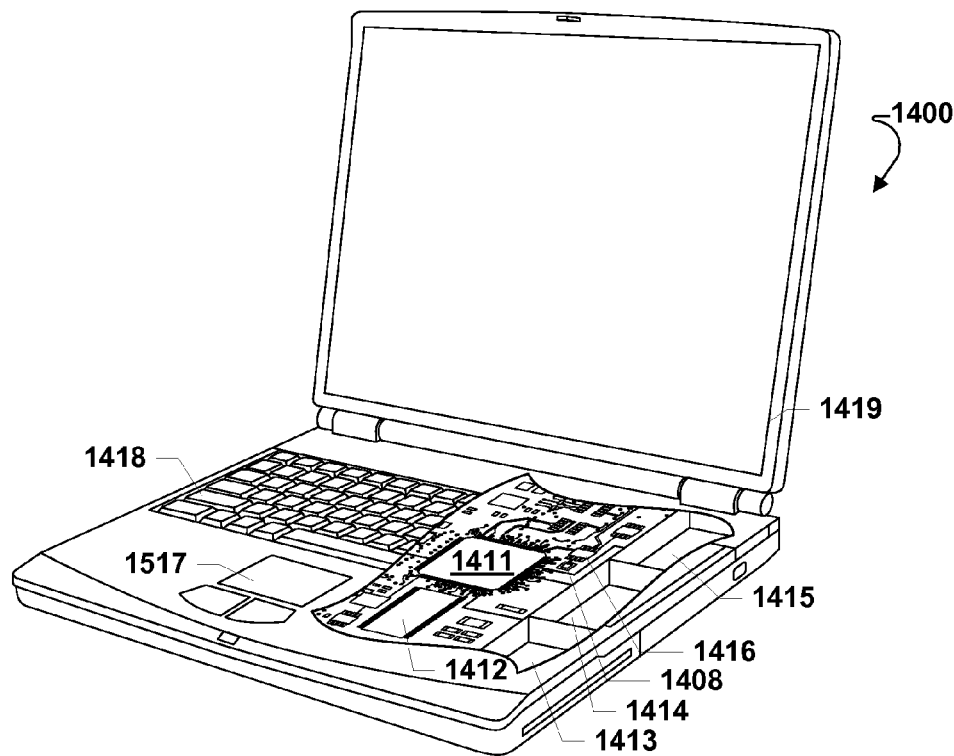

FIG. 14 illustrates component block diagrams of an example computing device suitable for use with the various aspects.

Figure 15:
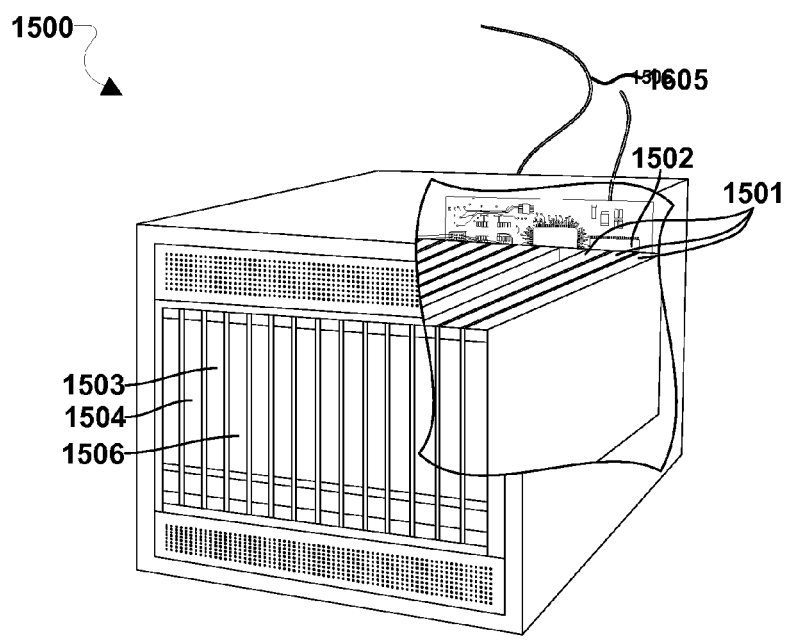

FIG. 15 illustrates component block diagrams of an example server device suitable for use with the various aspects.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" is used herein to refer to any one or all of cellular telephones, smartphones, personal data assistants (PDA's), personal computers, laptop computers, tablet computers, smartbooks, ultrabooks, palm-top computers, multimedia Internet enabled cellular telephones, desktop computers, computer servers, data servers, application specific servers, and similar personal or commercial electronic devices which include a memory, and one or more programmable processors.

The terms "system-on-chip" (SoC) and "integrated circuit" are used interchangeably herein to refer to a set of interconnected electronic circuits typically, but not exclusively, including multiple hardware cores, a memory, and a communication interface. The hardware cores may include a variety of different types of processors, such as a general purpose multi-core processor, a multi-core central processing unit (CPU), a multi-core digital signal processor (DSP), a multi-core graphics processing unit (GPU), a multi-core accelerated processing unit (APU), and a multi-core auxiliary processor. A hardware core may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon. Such a configuration may also be referred to as the IC components being on a single chip.

The present inventors realized that some battery chemistries require special operational modes or battery-cell management functions. When combined with the need for emerging customer-centric features, such as improved fault-tolerant behavior and limp-mode operation, the need for inverter pre-regulation is apparent. In some of the present embodiments, in order to do all of this in a cost effective way, a distributed yet simple set of electronics is used where characteristically expensive components, such as high current inductors, are sparingly applied.

Figure 1:
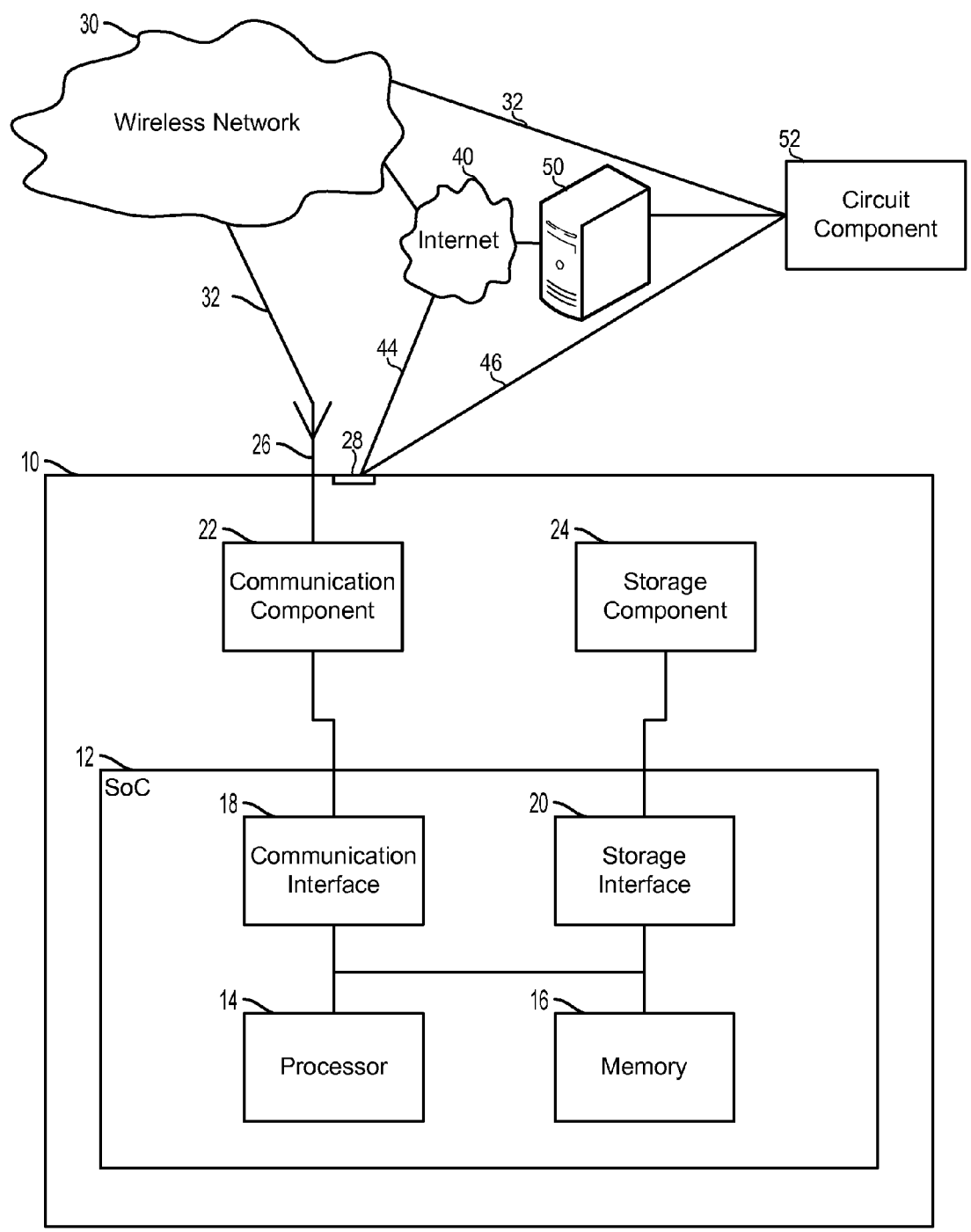
FIG. 1 illustrates a schematic diagram of a controller connected to a circuit component in accordance with an aspect.

FIG. 1 illustrates a system having a computing device 10 in communication with a circuit component 52. The computing device 10 may include an SoC 12 with a processor 14, a memory 16, a communication interface 18, and a storage interface 20. The computing device may further include a communication component 22 such as a wired or wireless modem, a storage component 24, an antenna 26 for establishing a wireless connection 32 to a wireless network 30, and/or the network interface 28 or connecting to a wired connection 44 to the Internet 40 and another computing device 50 and/or a direct wired connection 46 to the circuit component 52. The processor 14 may include any of a variety of hardware cores as described above. The processor 14 may further include a number of processor cores. The SoC 12 may include one or more processors 14. The computing device 10 may include one or more SoCs 12, thereby increasing the number of processors 14 and processor cores. The computing device 10 may also include processor cores 14 that are not associated with an SoC 12. The processors 14 may each be configured for specific purposes that may be the same or different from other processors 14 of the computing device 10. Processors 14 configured for the same purpose may be considered equivalent processors. Further, equivalent processors 14 may be configured to have similar performance characteristics. Further, individual processors 14 may be multi-core processors having a plurality of equivalent and/or distinct processor cores.

The memory 16 of the SoC 12 may be a volatile or non-volatile memory configured for storing data and processor-executable code for access by the processor 14. In an aspect, the memory 16 may be configured to, at least temporarily, store a data and commands relating to multiple states and operations of various components of an electrical circuit, such as the energy storage and dispensation circuit, states, and operations described herein. The computing device 10 and/or SoC 12 may include one or more memories 16 configured for various purposes. In an aspect, one or more memories 16 may be configured to be dedicated to storing the data and commands relating to the multiple states and operations of the various components of the electrical circuit, such that data and commands may be accessed by one or more processors 14. When the memory 16 storing the data and commands is non-volatile, the memory 16 may retain the data and commands even after the power of the computing device 10 has been shut off. When the power is turned back on and the computing device 10 reboots, the memory 16 may be available to the computing device 10 to provide the information of the data and commands.

The communication interface 18, communication component 22, antenna 26 and/or network interface 28, may work in unison to enable the computing device 10 to communicate over a wireless network 30 via a wireless connection 32, and/or a wired network 44, 46, with the circuit component 52. The wireless network 30 may be implemented using a variety of wireless communication technologies, including, for example, radio frequency spectrum used for wireless communications, to provide the computing device 10 with a connection to the Internet 40 by which it may exchange data with the circuit component 52. In an aspect, a wireless network 30 and/or a wired connection 44 to the Internet 40 via another computing device 50 may be used to communicate state data from energy storage devices connected to the circuit component 52, and/or operational commands to the circuit component 52.

The storage interface 20 and the storage component 24 may work in unison to allow the computing device 10 to store data and commands relating to the multiple states and operations of the various components of the electrical circuit on a non-volatile storage medium. The storage component 24 may be configured much like an aspect of the memory 16 in which the storage component 24 may store the data and commands, such that the data and commands may be accessed by one or more processors 14. The storage component 24, being non-volatile, may retain the data and commands even after the power of the computing device 10 has been shut off. When the power is turned back on and the computing device 10 reboots, the storage component 24 may be available to the computing device 10 to provide the information of the data and commands. The storage interface 20 may control access the storage device 24 and allow the processor 14 to read data from and write data to the storage device 24.

It should be noted that some or all of the components of the computing device 10 may be differently arranged and/or combined while still serving the necessary functions. Moreover, the computing device 10 may not be limited to one of each of the components, and multiple instances of each component, in various configurations, may be included in the computing device 10. The computing device 10 may housed in a single housing, or the components may be dispersed into various containment units while allowing the components to be in communication with each other. The computing device 10 may also be integrated into a larger device or system.

FIG. 2 illustrates an energy storage and dispensation circuit 200. The energy storage and dispensation circuit 200 may include a power grid connector 202, a power inverter 204, a central power converter 206, an inductor 208, one or more switch devices 210, 212, 214 and 216, one or more energy storage devices, 218, 220, 222, and 224 and a controller 226. The power grid connector 202 may include an electrical output that is capable of connecting the energy storage and dispensation circuit 200 to a power grid. The connection to the power grid may be such that the power grid connector 202 allows for a bidirectional flow of electrical power from the power grid to the energy storage and dispensation circuit 200, and from the energy storage and dispensation circuit 200 to the power grid. Thus, during the various states and operations of the energy storage and dispensation circuit 200, as described further herein, the power grid connector 202 may allow for the energy storage and dispensation circuit 200 to provide electrical power to the power grid when desired to supplement the electrical power of the power grid. The power grid connector 202 may also allow for the energy storage and dispensation circuit 200 to receive electrical power from the power grid to store excess electrical power of the power grid or help start the energy storage devices 218, 220, 222, and 224 of the energy storage and dispensation circuit 200. The power grid connector 202 may include at least two power terminals, a positive power terminal and a negative power terminal. Each power terminal may connect portions of the energy storage and dispensation circuit 200 to at least a portion of the power grid carrying positively charged electrical power, and may connect portions of the energy storage and dispensation circuit 200 to at least a portion of the power grid carrying a negatively charged electrical power.

The power grid connector 202 may also be connected to the power inverter 204 of the energy storage and dispensation circuit 200. The power inverter 204 may allow for the bidirectional flow of electrical power between the power grid connector 202 and the other components of the energy storage and dispensation circuit 200. Moreover, the power inverter 204 may modify the electrical power it receives from either the power grid connector 202 or the other components of the energy storage and dispensation circuit 200 so that the electrical power it provides to these various components is in a usable format. In other words, the power grid generally may convey an alternating current ("A/C") and the energy storage and dispensation circuit 200 may use a direct current ("D/C") for various operations. Thus, the power inverter 204 may modify an incoming current, from the power grid to the energy storage and dispensation circuit 200, from an A/C current to a D/C current. Similarly, the power inverter may modify an outgoing current, from the energy storage and dispensation circuit 200 to the power grid, from a D/C current to an A/C current.

The power inverter 204 may be connected to the central power converter 206 of the energy storage and dispensation circuit 200. The central power converter 206 may allow for the bidirectional flow of electrical power between the inverter 204 and the energy storage devices 218, 220, 222, and 224 connected in series via the inductor 208 and the switch devices 210, 212, 214 and 216. The central power converter 206 may receive a D/C current from the power inverter 204 and may allow the D/C current to pass through the central power converter to the energy storage devices 218, 220, 222, and 224 without any modification of the D/C current. The central power converter may also step up or step down the amperage of the D/C current for being provided to the energy storage devices 218, 220, 222, and 224 for varying circumstances. The D/C current between the central power converter 206 and the energy storage devices 218, 220, 222, and 224 may pass through a single inductor 208 connected between one end, such as the positive end of the central power converter 206 and an end of the series of energy storage devices 218, 220, 222, and 224. The central power converter 206 may be connected to the inductor 208 by an input/output connector which may be referred to herein as a first input/output of the central power converter 206. The central power converter 206 may be connected to the power inverter 204 at a positive terminal, or a first power inverter input/output, by an input/output connector which may be referred to herein as a second input/output of the central power converter 206. The central power converter 206 may also be connected to the power inverter 204 at a negative terminal, or a second power inverter input/output, by an input/output connector which may be referred to herein as a third input/output of the central power converter 206.

As noted above, the central power converter 206 may be connected to the inductor 208 of the of the energy storage and dispensation circuit 200. The energy storage and dispensation circuit 200 may be constructed such that it includes only a single inductor 208 in the entire circuit which is located between the central power converter 206 and a first end of the series of energy storage devices 218, 220, 222, and 224. As described further herein, the switch devices 210, 212, 214 and 216, connected to the energy storage devices 218, 220, 222, and 224 may act as individual power converters for each energy storage devices 218, 220, 222, and 224. However, connecting all of the switch devices 210, 212, 214 and 216, in series with one inductor 208 may obviate the need for each all of the switch devices 210, 212, 214 and 216, to independently include a respective inductor. This construction of the energy storage and dispensation circuit 200 including the single inductor 208 connected in series to the first end of the series of energy storage devices 218, 220, 222, and 224 and thus, also reduce the switch devices 210, 212, 214 and 216 in series, may reduce the cost of redundant components. It should be noted that the single inductor 208 may include various equivalent configurations of components that may perform in the same manner as the single inductor 208, such as more inductors connected in series or in parallel, where the group of inductors may be connected to the first end of the series of energy storage devices 218, 220, 222, and 224.

As described above, the inductor 208 may be connected to a series of switch devices 210, 212, 214 and 216, and energy storage devices 218, 220, 222, and 224. The switch devices 210, 212, 214 and 216, may be connected in series to each other. Each switch device 210, 212, 214 and 216, may also be connected to a respective energy storage device 218, 220, 222, and 224. For example, switch device 210 may be connected at a first switch device input/output to the inductor 208, to a positive terminal and a negative terminal of energy storage device 218 at a second and third switch device input/output, and to a first switch device input/output of switch device 212 at a fourth switch device input/output. Switch device 212 is similarly connected to energy storage device 220 and the switch device 214. Similar connections between the remaining switch devices 212 and 214 and the remaining energy storage devices 222 and 224 except that the last switch device 224 of the series may be connected to a fourth input/output of the central power converter 206 at its fourth switch device input/output. The connections of the energy storage devices 218, 220, 222, and 224 in series may be dynamically configurable by the switch devices 210, 212, 214 and 216. For example, any of the switch devices 210, 212, 214 and 216, may be dynamically configured in a bypass mode. In the bypass mode, the switch devices 210, 212, 214 and 216, may electrically disconnect a respective energy storage device 218, 220, 222, and 224 from the series of energy storage devices 218, 220, 222, and 224. The switch devices 210, 212, 214 and 216, may embody a variety of different components to enable the various operations of the energy storage and dispensation circuit 200, including bypassing, connecting, reversing polarization, and stepping up or down current for the energy storage devices 218, 220, 222, and 224. For example, the switch devices 210, 212, 214 and 216 preferably lack an inductor, and may embody a solid state switch without an inductor, an H-bridge circuit having two phase legs and four switches, or a bridge circuit having one phase leg and two switches. Each of the switch devices 210, 212, 214 and 216, may be individually connected to and controlled by the controller 226 described further herein.

The energy storage devices 218, 220, 222, and 224 may include a combination of components. Some such components (e.g., batteries) may be configured to store electrical power for later use, such as by the power grid or by another of the energy storage devices 218, 220, 222, and 224. An example of an energy storage device 218, 220, 222, and 224 may be a flow battery, as described in U.S. patent application Ser. No. 13/630,572, the disclosure of which is hereby incorporated by reference in its entirety, or another battery module comprising a stack of electrodes and an electrolyte. A flow battery module comprises a stack of anode and cathode electrodes, a separate electrolyte reservoir and at least one pump used to pump the electrolyte between the reservoir and the stack. The electrolyte contains a metal compound, such as a metal halide, for example, zinc bromide or zinc chloride. The metal, such as zinc, plates on one of the electrodes (e.g., the negative electrode) in charge mode and de-plates from the same electrodes back into the electrolyte in discharge mode.

It should be noted that the number of switch devices and energy storage devices described herein are meant to be exemplary and in no way limiting. Any number of switch devices and energy storage devices, greater or fewer than the numbers described herein (e.g., 2 to 200, such as 4 to 20), may be connected in series, as described above, to be included in the energy storage and dispensation circuit 200.

As described above, the energy storage and dispensation circuit 200 may include a controller 226 connected to the switch devices 210, 212, 214 and 216, and capable of individually controlling the switch devices 210, 212, 214 and 216. The controller 226 may include some or all of the components described with reference to the computing device 10 of FIG. 1 (e.g., the controller 226 corresponds to the computing device 10 and the remaining circuit components correspond to the circuit 52). The controller 226 may receive indications of the states of the energy storage and dispensation circuit 200, and more particularly of the individual energy storage devices 218, 220, 222, and 224 or making reading of the same components and determine the states from the readings. The various states of the energy storage devices 218, 220, 222, and 224 may cause the controller 226 to induce charging or discharging modes for the energy storage and dispensation circuit 200. The controller 226 may continue to monitor the states of the energy storage devices 218, 220, 222, and 224 during charging and discharging of the energy storage devices 218, 220, 222, and 224 and modify the behavior of the switch devices 210, 212, 214 and 216, individually for the respective energy storage devices 218, 220, 222, and 224. This ability to monitor and individually modify may allow the controller change and maintain conditions for the individual energy storage devices 218, 220, 222, and 224 as they charge and discharge (e.g., deplete) at different rates due to variations in the energy storage devices 218, 220, 222, and 224 themselves. Similarly, the controller 226 may be connected to and may modify the central power converter 206, instructing the central power converter 206 on whether to allow current from the power grid to flow to the energy storage devices 218, 220, 222, and 224 or to output current from the energy storage devices 218, 220, 222, and 224 to the power grid. The controller 226 may also instruct the central power converter 206 step up or down the current passing through it. The modifications that may be made by the controller 226 are described in further detail below. It should be noted that the controller 206 may be separate or integrated into any of one or more of the components of the energy storage and dispensation circuit 200.

Figure 3:
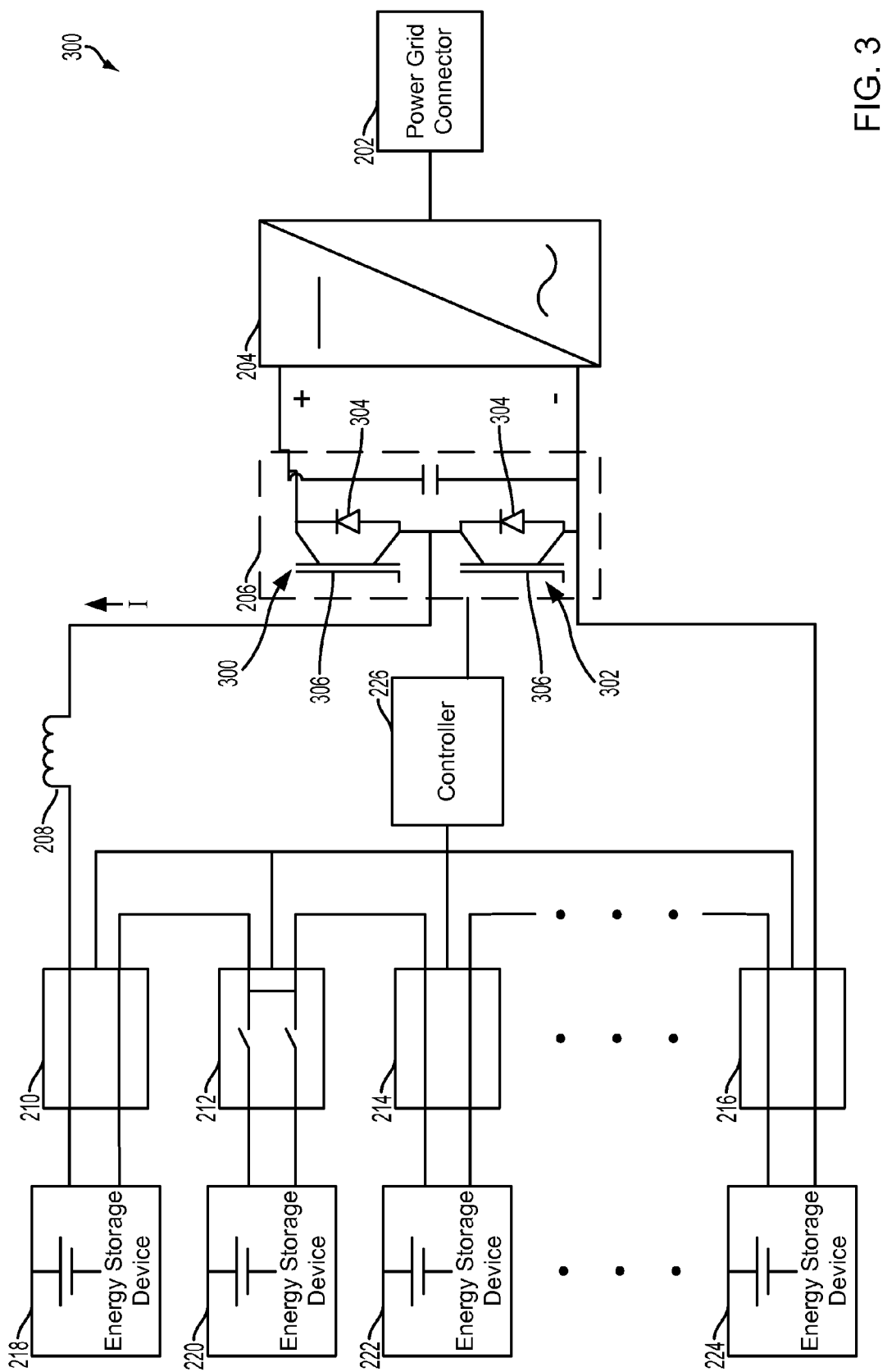

The energy storage and dispensation circuit 300 in FIG. 3 is similar to the energy storage and dispensation circuit 200 circuit as depicted in FIG. 2, however further detail is provided. The central power converter 206 may further include a charge buck component 300 and a discharge boost component 302. Each of the charge buck component 300 and the discharge boost component 302 may each include a diode 304 connected in parallel with an insulated-gate bipolar transistor 306. The charge buck component 300 may be connected to the power inverter 204 via the second input/output of the central power converter 206, and to the first end of the series of energy storage devices 218, 220, 222, and 224 via the first input/output of the central power converter 206 and the inductor 208. The discharge boost component 302 may be connected to the power inverter 204 via the third input/output of the central power converter 206, to the first end of the series of energy storage devices 218, 220, 222, and 224 via the first input/output of the central power converter 206 and the inductor 208, and to a second end of the series of energy storage devices 218, 220, 222, and 224 via the fourth input/output of the central power converter 206. It should be noted that the charge buck component 300 and the discharge boost component 302 may perform conventional functions of the components, but also allow for bidirectional flow of electrical power. Optionally, a capacitor is connected between the second and third input/outputs of the central power converter 206.

FIG. 3 illustrates the energy storage and dispensation circuit 300 in charge mode without energy storage device pulsing and with timed energy storage device bypass. The controller 226 may induce a charge mode when it is told or determines that the energy storage devices 218, 220, 222, and 224 are depleted. This may generally be determined by measuring the current or voltage of the series of energy storage devices 218, 220, 222, and 224 or the individual energy storage devices 218, 220, 222, and 224. The controller 226 may receive such measurements and make the determination as to whether the energy storage devices 218, 220, 222, and 224 are depleted. In an aspect the controller 226 may receive a signal indicating that one or more of the energy storage devices 218, 220, 222, and 224 are depleted. For lower current charging, the controller 226 may regulate the amount of current to deliver to the energy storage devices 218, 220, 222, and 224 by instructing the central power converter 206 to step down the current being received from the power grid. In this slow charging state, the controller 226 may instruct a number of the switch devices 210, 212, 214 and 216, to connect the energy storage devices 218, 220, 222, and 224 to the central power converter 206. The controller 226 may also instruct each switch device 210, 212, 214 and 216, to bypass its respective energy storage device 218, 220, 222, and 224. The instruction to bypass one of the energy storage devices 218, 220, 222, and 224 may include the instruction to bypass and an amount of time for the bypass. In an embodiment, the switch devices 210, 212, 214 and 216, may respond to an instruction from the controller 226 to bypass the energy storage devices 218, 220, 222, and 224 by bypassing for a preconfigured amount of time.

FIG. 3 illustrates an example where switch devices 210, 214 and 216, respond to a charge mode command by connecting their respective energy storage devices 218, 222, and 224 to the central power converter 206. In this example, the controller 226 sends a bypass command to the switch device 212, which responds to the command by opening and closing designated components, such as switches, to prevent current flowing to or from energy storage device 220. This results in switch devices 210, 212, 214 and 216, connecting energy storage devices 218, 222, and 224 in series while bypassing energy storage device 220. The controller 226 may, follow a pattern, or determine which of the connected energy storage devices 218, 222, and 224 to bypass next, and switch device 212 may be instructed to or on expiration of the preconfigured time period reconnect the energy storage device 220 to the central power converter 206.

FIG. 3 also illustrates the energy storage and dispensation circuit 300 with a energy storage device in an out of service state in any mode. In an aspect, the controller 226 may be able to detect faults in the energy storage devices 218, 220, 222, and 224 either by measured parameters received by the controller 226, or by a fault signal received by the controller 226. When a fault is identified by the controller 226 in the energy storage devices 218, 220, 222, and 224, a signal may be sent to the respective switch devices 210, 212, 214 and 216, to isolate the faulty energy storage devices 218, 220, 222, and 224. Much like the temporary bypass described above, to isolate the faulty energy storage devices 218, 220, 222, and 224 the switch devices 210, 212, 214 and 216, may be instructed to bypass their respective faulty energy storage devices 218, 220, 222, and 224 disconnecting it from the series of faulty energy storage devices 218, 220, 222, and 224. In the example illustrated in FIG. 3, the controller 226 has identified a fault relating to energy storage device 220, signaled switch device 212 to respond to the fault, and switch device 212 has configured itself to bypass energy storage device 220. In an aspect, the instruction from the controller 226 may include the configuration from the switch device 212, or may simply indicate to the switch device 212 that a fault exists with energy storage device 220, and switch device 212 may be preconfigured to respond by bypassing energy storage device 220. In an aspect, when the fault is temporary, the controller 226 may indentify when the fault passes or is remedied, and similarly instruct the switch devices 210, 212, 214 and 216, to reconnect their respective energy storage devices 218, 220, 222, and 224 to the central power converter 206.

Figure 4:
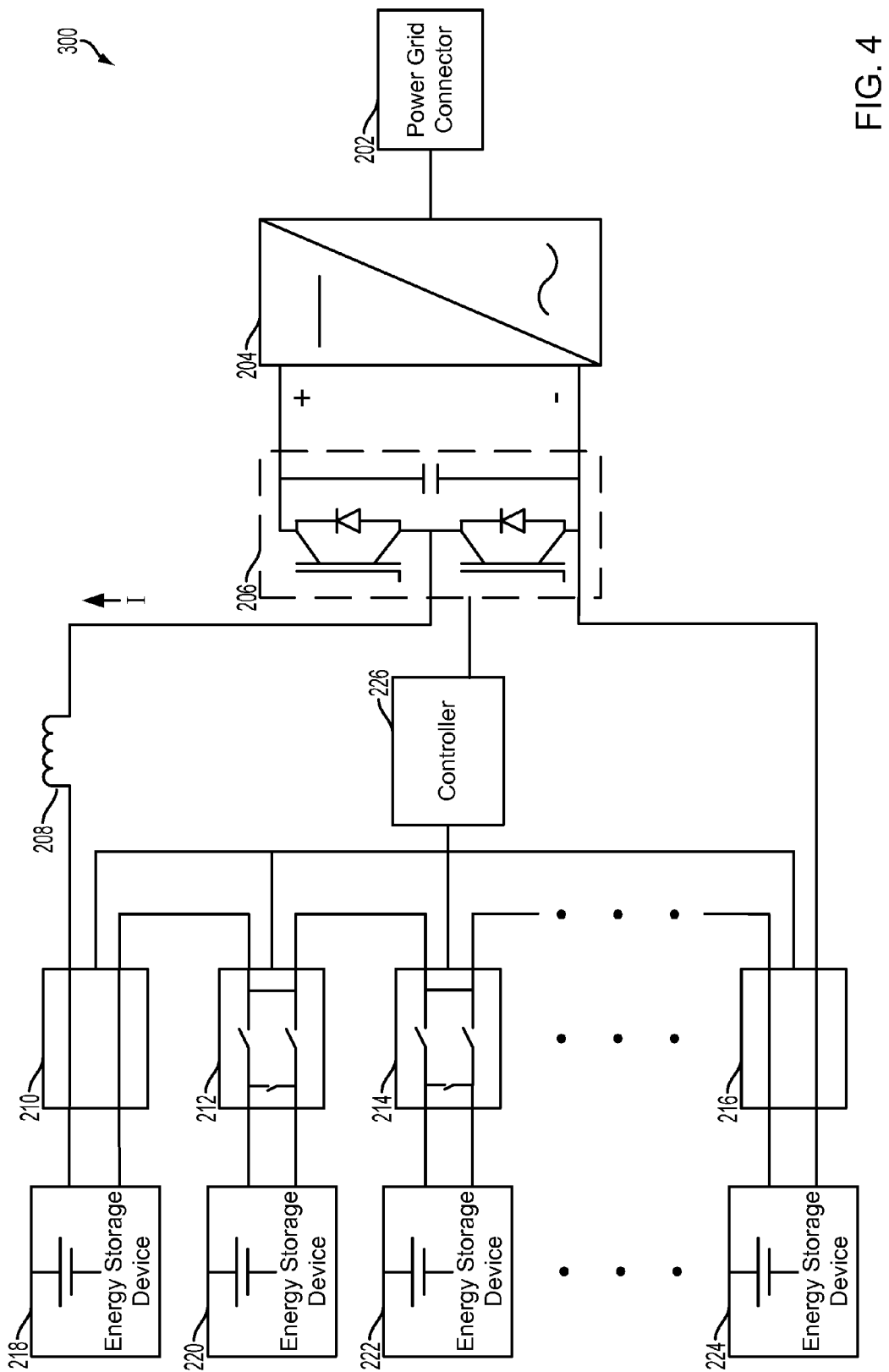

FIG. 4 illustrates the energy storage and dispensation circuit 300 in charge mode without energy storage device pulsing and with sequenced boost-bypass of energy storage devices. To increase the charging rate of the energy storage devices 218, 220, 222, and 224 the controller 226 may instruct the central power converter 206 to act as a pass-through for the current received from the power grid, rather than stepping down the current as described in FIG. 3. The controller 226 may also sequentially signal one or more of the switch devices 210, 212, 214 and 216, to bypass their respective energy storage devices 218, 220, 222, and 224. Bypassing the energy storage devices 218, 220, 222, and 224 may function similarly as described above. However, in this instance, when multiple energy storage devices 218, 220, 222, and 224 are bypassed, the current to each connected energy storage devices 218, 220, 222, and 224 increases by a greater amount, which may be determined by the controller 226 to be the necessary amount of current for achieving the desired charging rate of the energy storage devices 218, 220, 222, and 224.

FIG. 4 illustrates an example where multiple energy storage devices 200 and 222, are bypassed and the current to the connected energy storage devices 218 and 224 is increased. Thus, in this example, switch devices 212 and 214 receive instructions from the controller 226 to configure their components into a bypass formation. As described above, the controller 226 may determine the amount of time for bypass and which energy storage devices 218, 220, 222, and 224 to bypass. In an aspect, the controller 226 may pass a bypass command to the relevant switch devices 210, 212, 214 and 216, and the switch devices 210, 212, 214 and 216, may implement the bypass for a preconfigured amount of time. In either case, the amount of time may be dependent on the number of switch devices 210, 212, 214 and 216, instructed to bypass and the current being received. The controller may take some of all of these factors into account in determining the bypass time, or may provide varied signals to the switch devices 210, 212, 214 and 216, based on these factors and the switch devices 210, 212, 214 and 216, may implement an appropriate bypass time for the received signal.

Figure 5:
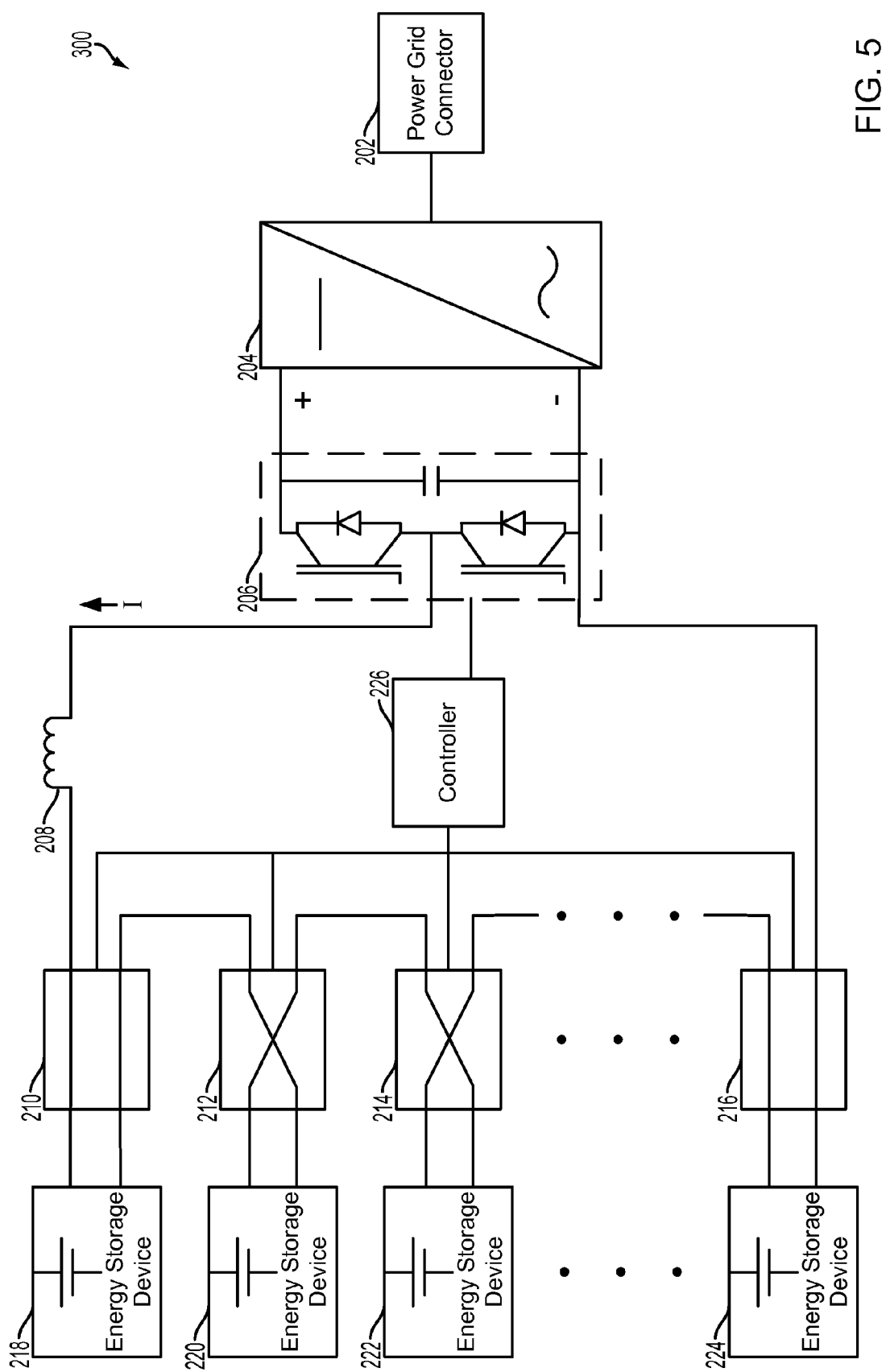

FIG. 5 illustrates the energy storage and dispensation circuit 300 in another aspect charge mode with energy storage device (e.g., flow battery) pulsing. This charge mode causes pulse plating of the components of the energy storage devices 218, 220, 222, and 224 while charging by reversing a polarity of individual energy storage devices 218, 220, 222, and 224 at an identical charge current amplitude. To implement this charge mode with energy storage device pulsing, the controller 226 may instruct the central power converter 206 to regulate the incoming current from the power grid to ensure the proper charge current when reversing the polarity of the energy storage devices 218, 220, 222, and 224. The controller may use a predetermined sequence or dynamically determine which energy storage devices 218, 220, 222, and 224 to pulse plate and for how long to reverse the polarity of the energy storage devices 218, 220, 222, and 224. In an aspect the timing may also be preconfigured in the switch devices 210, 212, 214 and 216. Similar to the above described bypassing, the controller 226 signals the one or more switch devices 210, 212, 214 and 216, to reverse the polarity of their respective energy storage devices 218, 220, 222, and 224. The signaled switch devices 210, 212, 214 and 216, may respond by configuring their components to reverse the polarity of the current that was being received by the respective energy storage devices 218, 220, 222, and 224 for either a preconfigured or instructed amount of time.

FIG. 5 illustrates an example, where switch devices 212 and 214 are instructed by the controller 226 to reverse the polarity of energy storage devices 200 and 222. While FIG. 5 illustrates that both switch devices 212 and 214 are configured to reverse the current polarity to the energy storage devices 200 and 222, it may be that each of switch devices 212 and 214 is signaled at different time and that they are merely overlapping in time, and not necessarily reversing the polarities in a synchronous manner.

Figure 6:
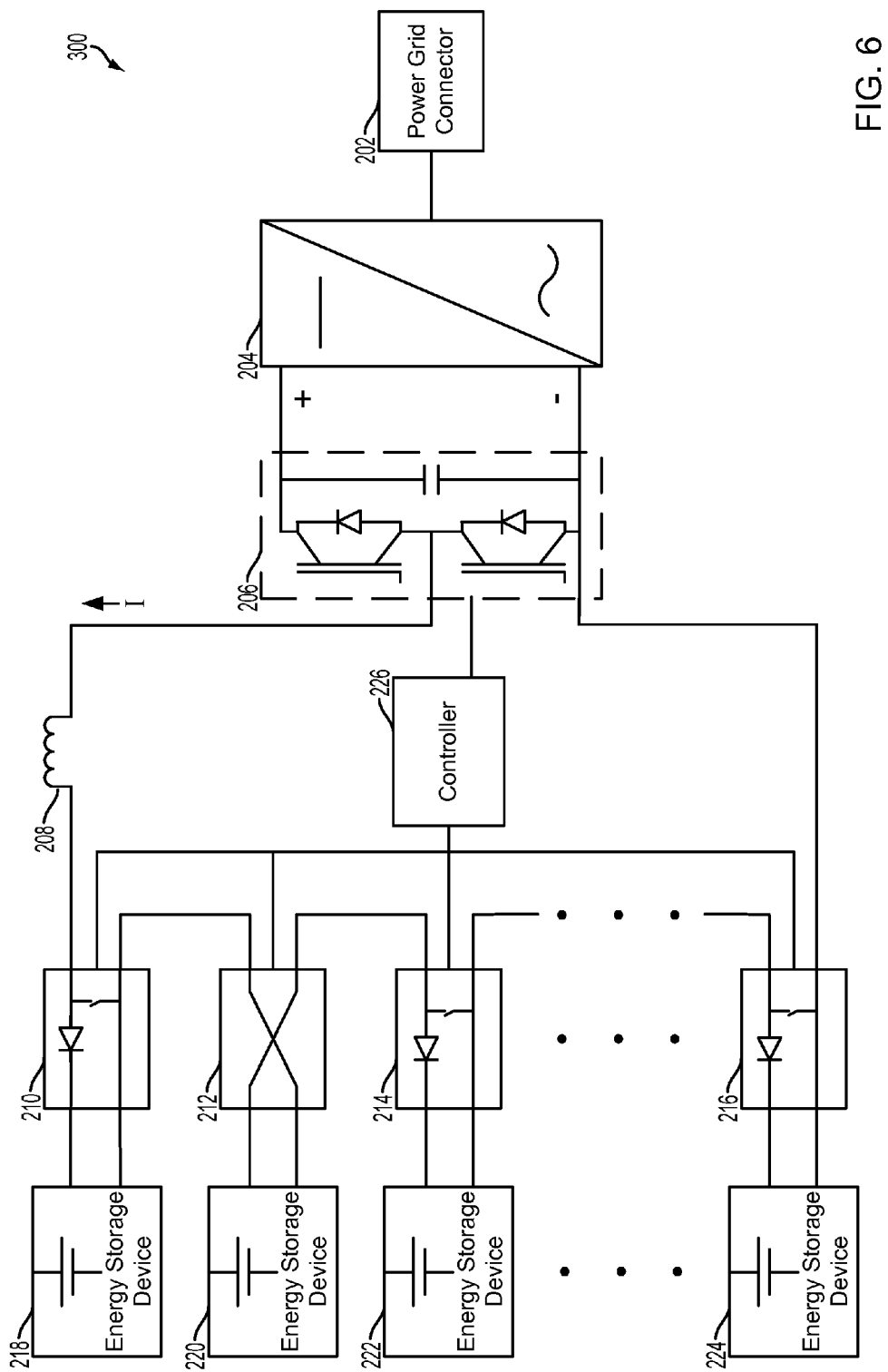

FIG. 6 illustrates the energy storage and dispensation circuit 300 in another aspect charge mode with a high current energy storage device pulsing (e.g., pulse a high current to deplate the metal from one flow battery electrodes while plating metal to electrodes of other flow batteries at a lower current). Like the energy storage device pulsing described above, the current pulsing by reversing the polarity of current to the energy storage devices 218, 220, 222, and 224 cause pulse plating of the components of the energy storage devices 218, 220, 222, and 224 while charging. To achieve the high current desired for this type of charging, the controller 226 may instruct the central power converter 206 to act as a pass-through for the current received from the power grid. The controller 226 may also instruct the switch devices 210, 212, 214 and 216, to implement the high current energy storage device pulsing in charging mode. In doing so, the controller 226 may instruct some of the switch devices 210, 212, 214 and 216, to connect their respective the energy storage devices 218, 220, 222, and 224 to the central power converter 206, while reversing the polarity of other energy storage devices 218, 220, 222, and 224. However, the high current may not be preferred for the standard polarity charging, thus the signal from the controller 226 may instruct the switch devices 210, 212, 214 and 216, to regulate the current received by their respective energy storage devices 218, 220, 222, and 224 while charging with the standard polarity. To regulate the charging current, the switch devices 210, 212, 214 and 216, may be instructed to be configured to alternately pass a stepped down current to the energy storage devices 218, 220, 222, and 224 and to bypass the energy storage devices 218, 220, 222, and 224. The bypassing of the energy storage devices 218, 220, 222, and 224 may occur at a relatively high frequency. The regulated current level may be determined by the controller 226 and parameters used for implementing the current regulation may be signaled to the switch devices 210, 212, 214 and 216. In an aspect, some or all of these parameters may be preconfigured in the switch devices 210, 212, 214 and 216, and the response to the instruction from the controller 226 may be to select the proper parameters and implement the associated current regulation. These parameters may be used to determine how much to step down the current and how frequently to bypass the energy storage devices 218, 220, 222, and 224. Similarly, the timing of when and for how long to pulse the energy storage devices 218, 220, 222, and 224 by reversing the polarity of the high level current may be supplied by the controller 226 or preconfigured in the switch devices 210, 212, 214 and 216. It should be mentioned, that unlike the current regulated pulsing described in FIG. 5, because in high current energy storage device pulsing the current is regulated by the switch devices 210, 212, 214 and 216, during charging, but not during pulsing, the pulsing current amplitude may differ from the charging current amplitude.

FIG. 6 illustrates an example where switch devices 210, 214 and 216, are instructed by the controller 226 to charge energy storage devices 218, 222, and 224 by regulating the charging current to energy storage devices 218, 222, and 224. In charging the energy storage devices 218, 222, and 224 the switch devices 210, 214 and 216, may configure to allow for alternating charging and bypassing. This may be accomplished by repeatedly and rapidly opening and closing a bypass circuit within the switch devices 210, 214 and 216. When the bypass circuit is open, the charging current may be directed to the energy storage devices 218, 222, and 224 and away from the energy storage devices 218, 222, and 224 when the bypass circuit is closed. Thus, the energy storage devices 218, 222, and 224 only receive a portion of the whole current provided to the energy storage and dispensation circuit 300. Further, in this example, the controller 226 may instruct switch device 212 to pulse the full amplitude of the reverse polarity current to the energy storage device 220. As described above, the frequency of the charging/bypassing cycle and the time periods for both the charging/bypassing cycle and the reverse polarity pulsing may be preconfigured in the controller or the switch devices 210, 212, 214 and 216, or either may determine the frequency and time periods based on the current state of the components of the energy storage and dispensation circuit 300.

Figure 7:
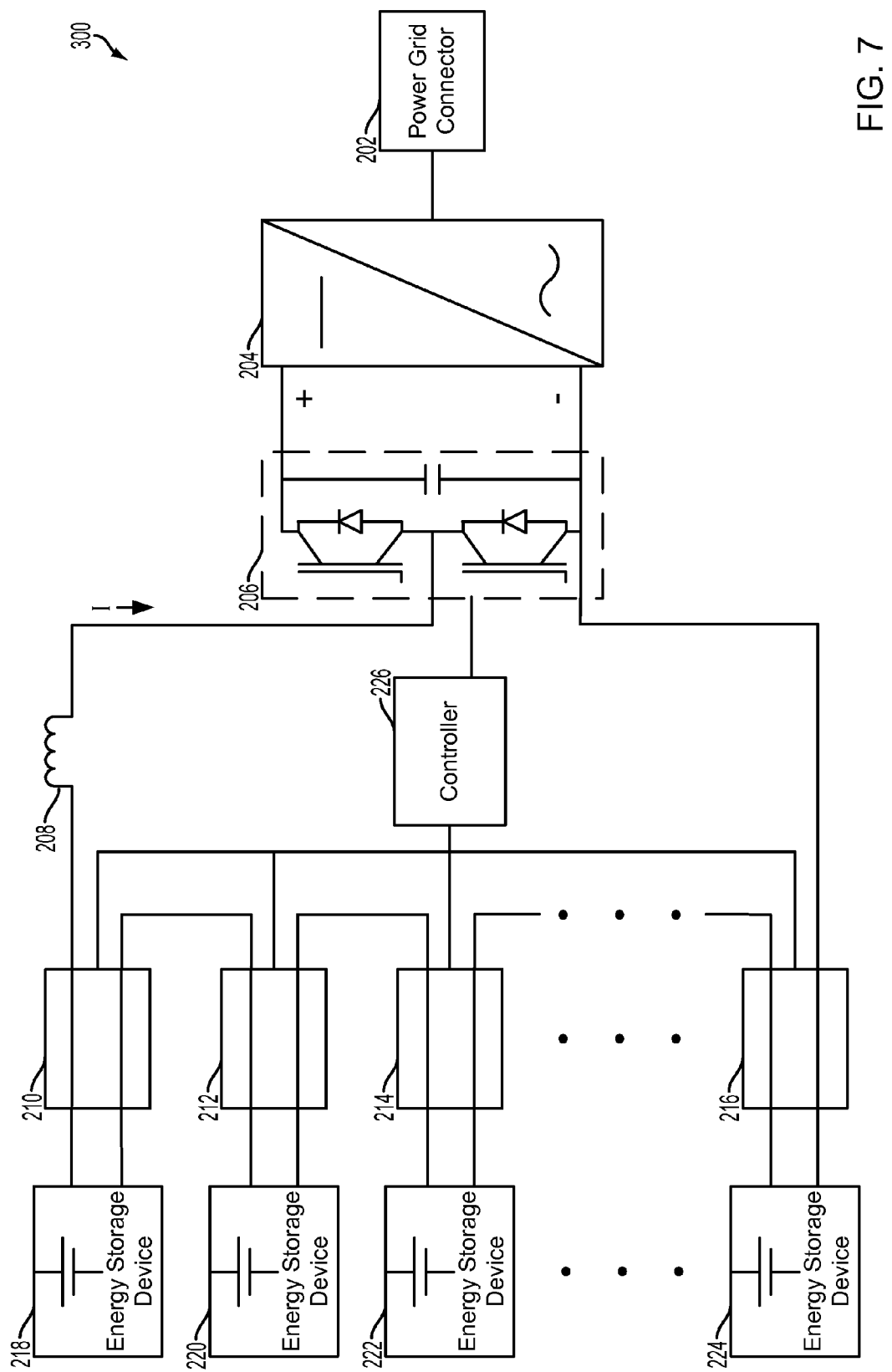

FIG. 7 illustrates the energy storage and dispensation circuit 300 in multiple states. In an aspect, one such state may include an idle mode. In the idle state, controller 226 may detect that the energy storage devices 218, 220, 222, and 224 are fully charged, and at that the power grid is not in need of supplemental power. The controller 226 may indicate to the central power converter to close at least the portion of the energy storage and dispensation circuit 300 containing the series of energy storage devices 218, 220, 222, and 224 from the power grid. The switch devices 210, 212, 214 and 216 may keep the energy storage devices 218, 220, 222, and 224 connected to each other in series, but there is no current flow between the energy storage devices 218, 220, 222, and 224 and the power grid. Thus, the energy storage devices 218, 220, 222, and 224 are neither charging nor discharging.

In an aspect, FIG. 7 illustrates the energy storage and dispensation circuit 300 in a discharge state (i.e., mode). In the discharge state, the controller 226 may receive an indication that the power grid is in need of supplemental power. When the switch devices 210, 212, 214 and 216, are not already connecting their respective energy storage devices 218, 220, 222, and 224 to the central power converter 206, the controller 226 may instruct the switch devices 210, 212, 214 and 216, to make the connections. The controller 226 also may instruct the central power controller to open the portion of the energy storage and dispensation circuit 300 containing the series of energy storage devices 218, 220, 222, and 224 to the power grid. Without any current regulation from the switch devices 210, 212, 214 and 216, the current flows from the energy storage devices 218, 220, 222, and 224 to the central power converter 206. Depending on the charge levels and/or the amount of power needed by the power grid, the controller 226 may instruct the central power converter 206 to regulate the amount of current provided from the energy storage devices 218, 220, 222, and 224 to the grid. As the charge levels deplete in the energy storage devices 218, 220, 222, and 224 the controller 226 may instruct the central power converter 206 to boost the current output to the grid. The controller 226 may also identify that the power reserves in the energy storage devices 218, 220, 222, and 224 are nearing depletion, either through receiving measured parameters and making a determination, or by receiving an indication of the state of the energy storage devices 218, 220, 222, and 224. Upon identifying the near depletion state, the controller 226 may instruct the central power converter to reduce the current draw on the energy storage devices 218, 220, 222, and 224 thus reducing the current provided to the power grid.

In an aspect, FIG. 7 illustrates the energy storage and dispensation circuit 300 in a blackstart discharge state (i.e., mode). In this state, the energy storage and dispensation circuit 300 relies entirely on the power provided from the energy storage devices 218, 220, 222, and 224. The controller may indentify that the power grid is in need of supplemental power. In an aspect, the power grid may have no power or insufficient power to operate even the energy storage and dispensation circuit 300. Similar to the discharge mode described above, the switch devices 210, 212, 214 and 216, are not already connecting their respective energy storage devices 218, 220, 222, and 224 to the central power converter 206, the controller 226 may instruct the switch devices 210, 212, 214 and 216, to make the connections. Also similar to the discharge mode, the switch devices 210, 212, 214 and 216, may not regulate the current from their respective energy storage devices 218, 220, 222, and 224. However, unlike the discharge mode above, rather than regulating the current for the series of respective energy storage devices 218, 220, 222, and 224 alone, in the blackstart discharge state the central power converter may also regulate the direct current voltage for the power inverter 204, by boosting the current to the power grid, increasing the direct current voltage on the power grid side of the central power converter 206.

Figure 8:
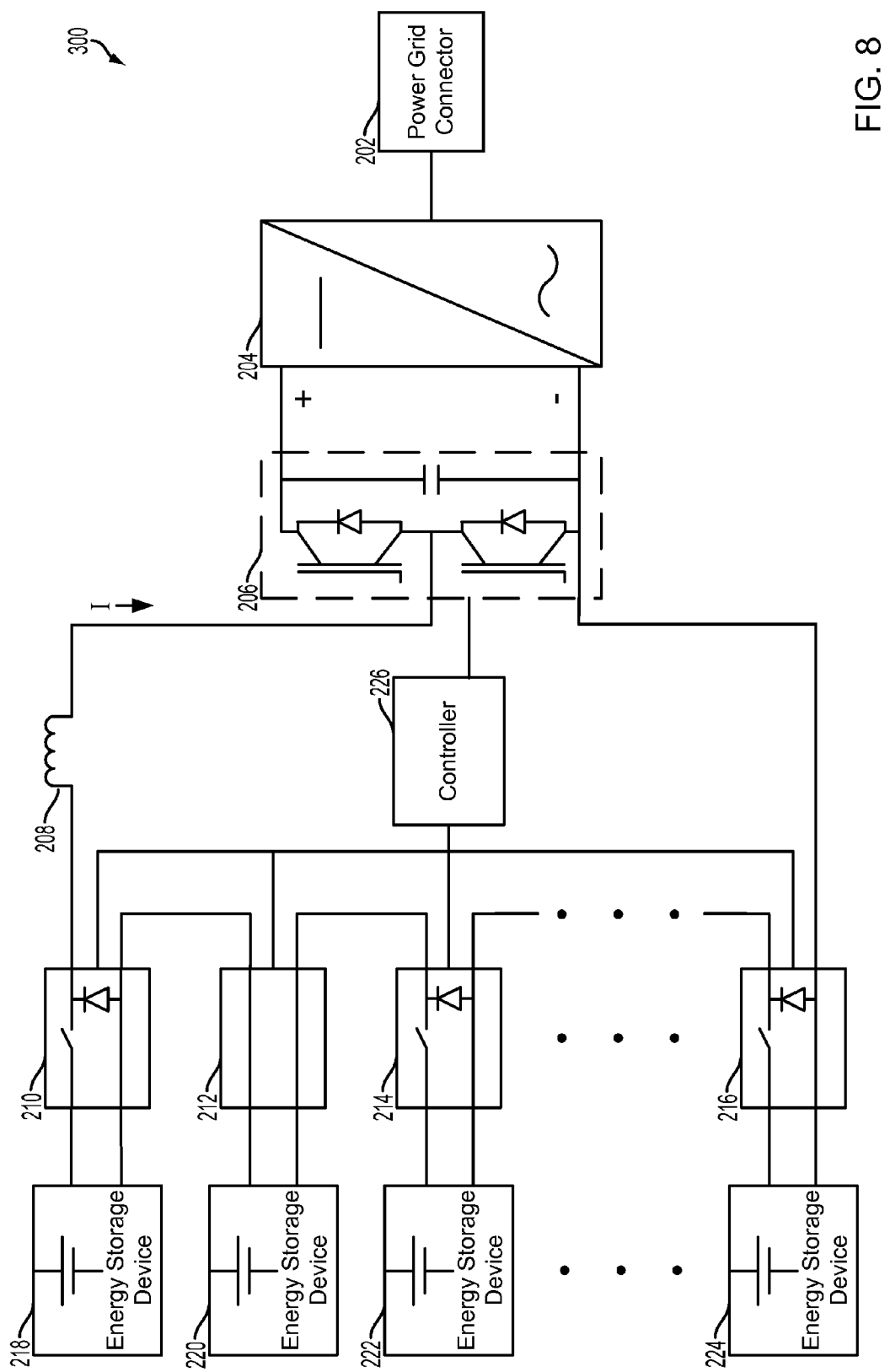

FIG. 8 illustrates the energy storage and dispensation circuit 300 in the discharge mode at a near depletion state for at least one of the energy storage devices 218, 220, 222, and 224. The controller 226 may identify that one of more of the energy storage devices 218, 220, 222, and 224 are nearing depletion by receiving measurements of the individual energy storage devices 218, 220, 222, and 224 and making a determination on their states. In an aspect, the controller 226 may receive measurements of the voltage of each of the energy storage devices 218, 220, 222, and 224. To determine that the energy storage devices 218, 220, 222, and 224 are nearing depletion, the controller 226 may compare the voltage readings to a near depletion threshold value. Depending on the relationship of the voltage measurements to the near depletion threshold, the controller 226 may identify whether the individual energy storage devices 218, 220, 222, and 224 are near depletion or not. In an aspect, the controller may receive an indication that identifies one or more of the energy storage devices 218, 220, 222, and 224 as being near depletion. When at least one of the energy storage devices 218, 220, 222, and 224 is identified to be near depletion, the controller 226 may instruct the respective switch devices 210, 212, 214 and 216, to manage the discharge of the nearly depleted energy storage devices 218, 220, 222, and 224. The controller's near depletion instruction may provide the switch devices 210, 212, 214 and 216, with instructions indicating how to manage the discharge of the energy storage devices 218, 220, 222, and 224 which may include instructions for configuring switch devices' components and/or parameter by which to reduce the current output of the respective energy storage devices 218, 220, 222, and 224. In an aspect, the instruction from the controller 226 may simply be an indicator to implement a preconfigured response to the near depletion state. To manage the discharge of nearly depleted energy storage devices 218, 220, 222, and 224 the switch devices 210, 212, 214 and 216, may configure their components to bypass at least some of the current from the previous energy storage devices 218, 220, 222, and 224 in the series. The switch devices 210, 212, 214 and 216, may also reduce the current output from the energy storage devices 218, 220, 222, and 224 by reducing the period in which the energy storage devices 218, 220, 222, and 224 is in connection with the central power converter 206.

FIG. 8 illustrates an example where the controller 226 identifies that energy storage devices 218, 222, and 224 are nearing depletion. In this example, energy storage device 220 is still within a normal discharge range. The controller 226 may signal switch devices 210, 214 and 216, to regulate the current discharged from their respective energy storage devices 218, 222, and 224. The switch devices 210, 214 and 216, may configure their components to allow for at least a partial bypass of energy storage devices 218, 222, and 224 by the current received by the energy storage devices 218, 222, and 224. Thus, some current from device 220 is bypassed around other devices to drop the current output from the partially bypassed devices. The switch devices 210, 214 and 216, may configure their components to allow for selective connection and disconnection of their respective energy storage devices 218, 222, and 224 from the central power converter 206. Each of the switch devices 210, 214 and 216, may apply a different rate of connecting and disconnecting their respective energy storage devices 218, 222, and 224. This rate may depend on the level of depletion of each of the energy storage devices 218, 222, and 224 and/or the instructions from the controller 226. During the near depletion state of the energy storage devices 218, 222, and 224 the controller 226 may continue to instruct the central power converter 206 to boost the current to the power grid. For example, an H-bridge in the switch devices performs a buck regulator function for their respective storage devices.

Figure 9:
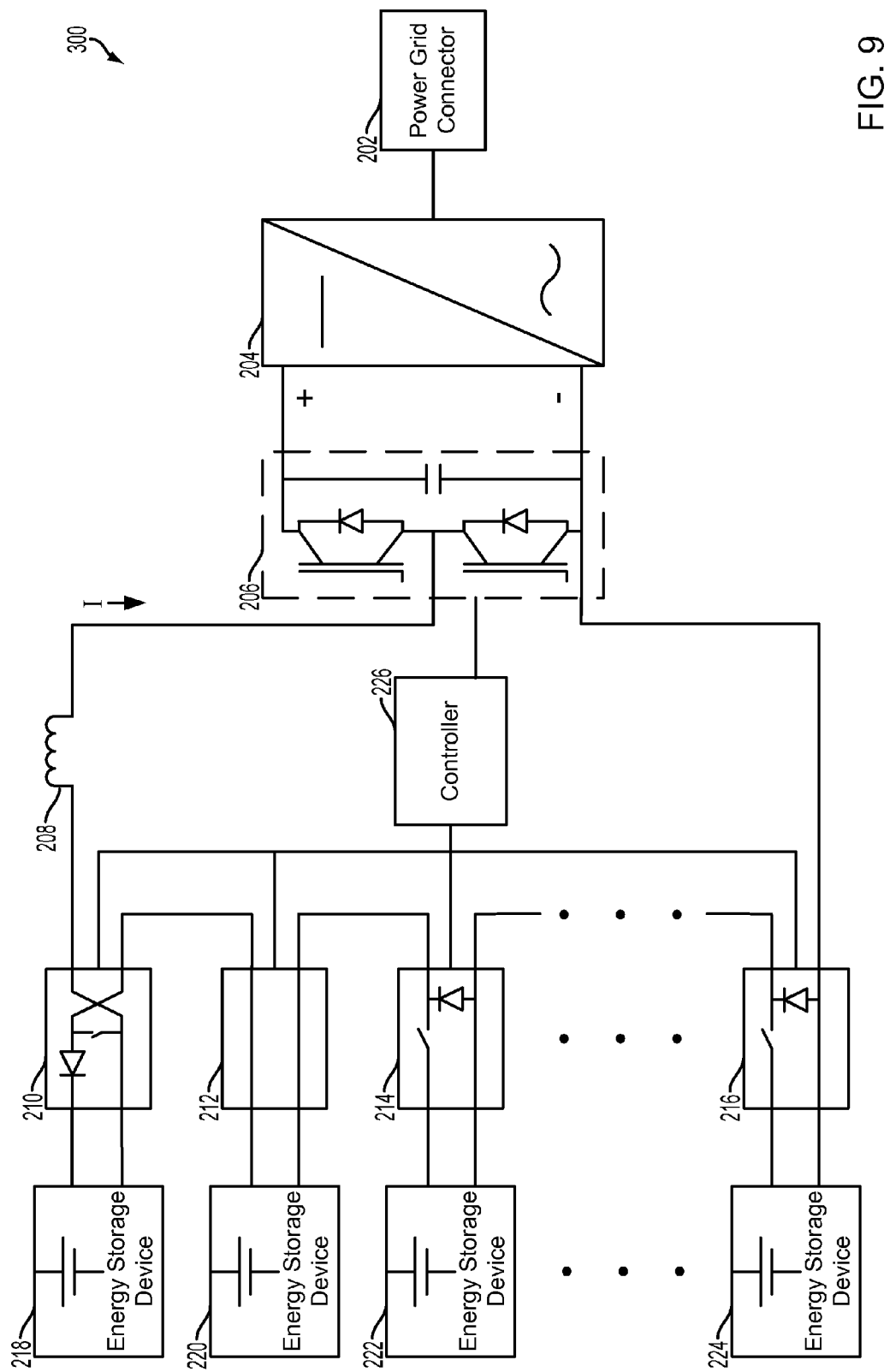

FIG. 9 illustrates the energy storage and dispensation circuit 300 in the discharge mode at a depleted state for at least one of the energy storage devices 218, 220, 222, and 224. Much like in the near depletion state, the controller 226 may identify that one of more of the energy storage devices 218, 220, 222, and 224 are depleted by receiving measurements of the individual energy storage devices 218, 220, 222, and 224 and making a determination of their states. In an aspect, the controller 226 may receive measurements of the voltage of each of the energy storage devices 218, 220, 222, and 224. To determine that the energy storage devices 218, 220, 222, and 224 are nearing depletion, the controller 226 may compare the voltage readings to a total depletion threshold value. Depending on the relationship of the voltage measurements to the total depletion threshold, the controller 226 may identify whether the individual energy storage devices 218, 220, 222, and 224 are depleted or not. In an aspect, the controller may receive an indication that identifies one or more of the energy storage devices 218, 220, 222, and 224 as being depleted. When at least one of the energy storage devices 218, 220, 222, and 224 is identified to be depleted, the controller 226 may instruct the respective switch devices 210, 212, 214 and 216, to manage applying a protective, cathodic current to the depleted energy storage devices 218, 220, 222, and 224 which may be in a chemical strip mode. The protective, cathodic current may include a small amount of the current discharged from the other energy storage devices 218, 220, 222, and 224 and having the current's polarity reversed by the respective switch devices 210, 212, 214 and 216. The controller's depleted instruction may provide the switch devices 210, 212, 214 and 216, with instructions indicating how to manage the protective, cathodic current applied to the energy storage devices 218, 220, 222, and 224 which may include instructions for configuring switch devices' components and/or parameter by which to apply the protective, cathodic current to the respective energy storage devices 218, 220, 222, and 224. In an aspect, the instruction from the controller 226 may simply be an indicator to implement a preconfigured response to the depleted state. To manage the protective, cathodic current applied to the depleted energy storage devices 218, 220, 222, and 224 the switch devices 210, 212, 214 and 216, may configure their components to siphon at least some of the current from the previous energy storage devices 218, 220, 222, and 224 in the series, and reverse its polarity. The switch devices 210, 212, 214 and 216, may manage the current input to the energy storage devices 218, 220, 222, and 224 by periodically connecting and disconnecting the energy storage devices 218, 220, 222, and 224 from the central power converter 206.

FIG. 9 illustrates an example where the controller 226 identifies that energy storage devices 222 and 224 are nearing depletion, as in FIG. 8, and energy storage device 218 is depleted. In this example, energy storage device 220 is still within a normal discharge range. The controller 226 may signal switch device 210 to apply the protective, cathodic current to energy storage device 218. The switch device 210 may configure its components to allow for at least some siphoning of the discharge current of energy storage devices 220, 222, and 224 and reversing the polarity of the siphoned current. The switch device 210 may configure its components to allow for selective connection and disconnection of energy storage device 218, from the central power converter 206. The switch device 210 may apply a different rate of connecting and disconnecting energy storage device 218 depending on the desired current level for the protective, cathodic current, and/or the instructions from the controller 226. During the depleted state of the energy storage device 218, the controller 226 may continue to instruct the central power converter 206 to boost the current to the power grid.

Figure 10:
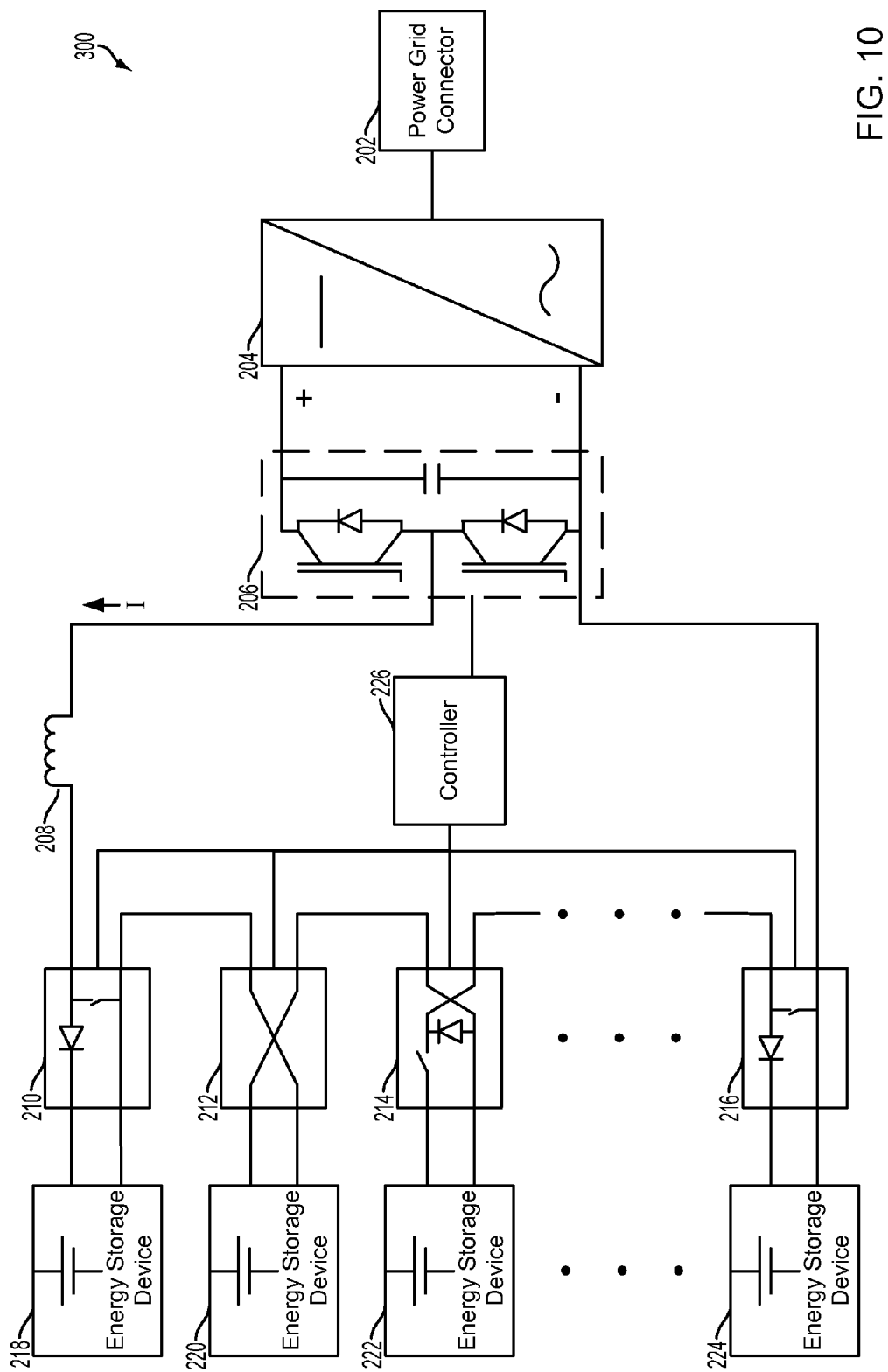

FIG. 10 illustrates the energy storage and dispensation circuit 300 in the discharge mode at a hybrid discharge/strip current reversal state for at least one of the energy storage devices 218, 220, 222, and 224. When enough energy storage devices 218, 220, 222, and 224 are depleted that the central power converter 206 can no longer maintain a sufficient current to the power grid, the controller 226 may instruct the switch devices 210, 212, 214 and 216, associated with non-depleted energy storage devices 218, 220, 222, and 224 to reverse their polarity as they continue to discharge. As such, the switch devices 210, 212, 214 and 216, associated with energy storage devices 218, 220, 222, and 224 that are depleted no longer need to reverse the current polarity, and may be updated by the controller 226. Further the controller 226 may instruct the central power converter to close at least the portion of the energy storage and dispensation circuit 300 with the series of energy storage devices 218, 220, 222, and 224 from the power grid. As with the other aspects described herein, in determining the state the individual energy storage devices 218, 220, 222, and 224 and/or the energy storage and dispensation circuit 300, the controller 226 may receive measurements of parameters from various components used to make a determination about the states, or receive indications of the states. The switch devices 210, 212, 214 and 216, may also receive from the controller 226 instructions on configuring their components, parameters for determining the configuration of the components, and/or an indicator of the state of the associated energy storage devices 218, 220, 222, and 224 for implementing a preconfigured response to the state. As with the depleted state, a protective, cathodic current is applied to the depleted energy storage devices 218, 220, 222, and 224. However, since the discharging energy storage devices 218, 220, 222, and 224 have reversed polarity, reversing the polarity at the switch devices 210, 212, 214 and 216, of the depleted energy storage devices 218, 220, 222, and 224 is unnecessary.

FIG. 10 illustrates an example where the controller 226 identifies that energy storage device 222 is nearing depletion, as in FIG. 8, energy storage devices 218 and 224 are depleted, as in FIG. 9, and the central power converter 206 can no longer provide a sufficient current to the power grid. In this example, energy storage device 220 is still within a normal discharge range. The controller 226 may signal the central power converter 206 to isolate the series of energy storage devices 218, 220, 222, and 224 from the power grid. The controller 226 may signal switch devices 212 and 214 to reverse their polarities in addition to the state response the switch devices 212 and 214 are already implementing. Further, the controller 226 may signal switch devices 210 and 216 to apply the protective, cathodic current to energy storage devices 218 and 224. The switch devices 210 and 216 may configure their components to allow for at least some siphoning of the discharge current of energy storage devices 220 and 222. The switch devices 210 and 216 may configure their components to allow for selective connection and disconnection of energy storage devices 218 and 224, from the central power converter 206. The switch devices 210 and 216 may apply different rates of connecting and disconnecting energy storage devices 218 and 224 depending on the desired current level for the protective, cathodic current, and/or the instructions from the controller 226.

Figure 11:
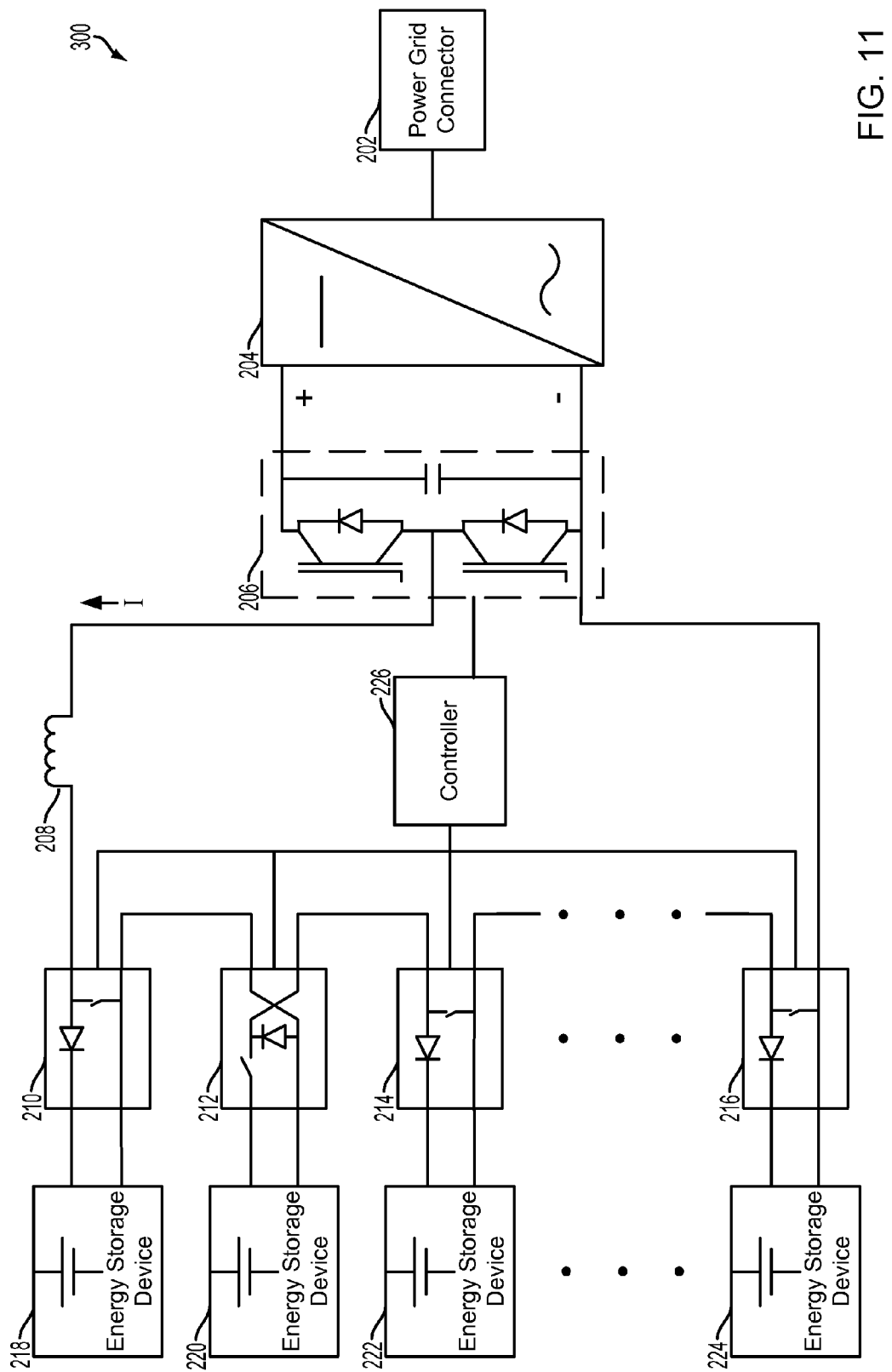

FIG. 11 illustrates the energy storage and dispensation circuit 300 in a strip mode for a majority of the energy storage devices 218, 220, 222, and 224. When enough of the energy storage devices 218, 220, 222, and 224 are depleted that the remaining, nearly depleted energy storage devices 218, 220, 222, and 224 cannot sustain the protective, cathodic current to the depleted energy storage devices 218, 220, 222, and 224, the controller 226 may signal to the central power converter to provide power from the grid to the energy storage devices 218, 220, 222, and 224. The central power converter 206 may be configured in response to signals from the controller 226 to provide sufficient supplemental power, on top of the remaining discharge current, to apply the protective, cathodic current to the depleted energy storage devices 218, 220, 222, and 224. Much like the previous aspects, the controller 226 may make its determination to signal the central power converter 206 based on measurements or defined signals, and may send instructions, parameters, and/or defined signals to the central power converter 206. Thus, the discharge current from device 220 and a reduced discharge current from device 222 is used to apply the protective, cathodic current to depleted devices 218, 224. The switch devices 210, 216 reverse the polarity while the switch devices 212, 214 do not.

FIG. 11 illustrates an example where the controller 226 identifies that energy storage device 220 is nearing depletion, as in FIG. 8, and can no longer provide sufficient current for the protective, cathodic current for depleted energy storage devices 218, 222, and 224. Therefore, the controller 226 signals the central power converter 206 to instruct it to provide a metered current to supplement the discharge current from energy storage device 220 for applying the protective, cathodic current to depleted energy storage devices 218, 222, and 224. As with, FIG. 10, the switch device 212, associated with remaining discharging energy storage device 220, is signaled by the controller to reduce its discharge current as discussed in FIG. 9, and reverse the polarity of its discharge current as discussed in FIG. 10. As such, the switch devices 210, 214 and 216, associated with the depleted energy storage devices 218, 222, and 224, are signaled by the controller 226 to allow for at least some siphoning of the discharge current from the remaining discharging energy storage device 220, and now to receive the supplemental current from the central power converter 206. Note, that like in FIG. 10, the switch devices 210, 214 and 216, associated with the depleted energy storage devices 218, 222, and 224, are not reversing their polarities as in FIG. 9.

FIG. 12 illustrates an aspect method 1200 for operating a plurality of energy storage devices in a charge mode. The method 1200 may be implemented by one or more components of the energy storage and dispensation circuit described herein, including the controller. The method 1200 may include controlling operation of the plurality of energy storage devices connected in series by independently varying a current and/or bypassing and/or reversing a polarity of at least one of the plurality of energy storage devices without a corresponding change in current, bypass, or reversal of polarity of one or more of the other energy storage devices connected in series. In block 1202, the controller may induce a charge mode in the plurality of energy storage devices connected in series. In determination block 1204, the controller determines whether to charge the energy storage devices at a low current, relative to the charging capacity of the energy storage and dispensation circuit. When the controller determines to charge the energy storage devices at the low current (i.e. determination block 1204="Yes"), in block 1206 the controller may bypass at least one of the plurality of energy storage devices and return to determination block 1204. When determination block 1204 repeatedly results in a determination to charge the energy storage devices at a low current, the energy storage device bypassed in successive executions of block 1206 may be different from the previously bypassed energy storage devices. For each bypass of an energy storage device, there is no need to implement a corresponding bypass of another energy storage device.

When the controller determines not to charge the energy storage devices at the low current (i.e. determination block 1204="No"), in determination block 1208 the controller may determine whether to charge the energy storage devices using a pulsed reversed polarity current. When the controller determines to charge the energy storage devices using the pulsed reversed polarity current (i.e. determination block 1208="Yes"), in determination block 1210 the controller may determine whether to charge the energy storage devices at a high current, relative to the charging capacity of the energy storage and dispensation circuit. When the controller determines not to charge the energy storage devices at the high current (i.e. determination block 1210="No"), in block 1212 the controller may reverse the polarity of the charging current for at least one of the plurality of energy storage devices and return to determination block 1204. When determination block 1208 repeatedly results in a determination to charge the energy storage devices using the pulsed reversed polarity current, the energy storage device for which the pulsed reversed polarity current is applied in successive executions of block 1212 may be different from the previous energy storage devices for which the pulsed reversed polarity current is applied. For each application the pulsed reversed polarity current to an energy storage device, there is no need to apply a corresponding pulsed reversed polarity current to another energy storage device.

When the controller determines to charge the energy storage devices at the high current (i.e. determination block 1210="Yes"), in block 1214 the controller may repeatedly bypass each of the energy storage devices at a high frequency to regulate the current received by each of the energy storage devices. In block 1216 the controller may reverse the polarity of the charging current for at least one of the plurality of energy storage devices, as in block 1212, and return to determination block 1204. When determination block 1208 repeatedly results in a determination to charge the energy storage devices using the pulsed reversed polarity current, the energy storage device for which the pulsed reversed polarity current is applied in successive executions of block 1216 may be different from the previous energy storage devices for which the pulsed reversed polarity current is applied. For each application the pulsed reversed polarity current to an energy storage device, there is no need to apply a corresponding pulsed reversed polarity current to another energy storage device.

When the controller determines to charge the energy storage devices without using the pulsed reversed polarity current (i.e. determination block 1208="No"), in block 1218 the controller may bypass a plurality of energy storage devices in order to boost the current to the other energy storage devices. When determination block 1208 repeatedly results in a determination to charge the energy storage devices without using the pulsed reversed polarity current, the energy storage devices bypassed in successive executions of block 1218 may be different from the previously bypassed energy storage devices. For each bypass of a plurality of energy storage devices, there is no need to implement a corresponding bypass of another plurality of energy storage devices.

FIG. 13 illustrates an aspect method 1300 for operating a plurality of energy storage devices in a discharge mode. The method 1300 may be implemented by one or more components of the energy storage and dispensation circuit described herein, including the controller. The method 1300 may include controlling operation of the plurality of energy storage devices connected in series by independently varying a current and/or bypassing and/or reversing a polarity of at least one of the plurality of energy storage devices without a corresponding change in current, bypass, or reversal of polarity of one or more of the other energy storage devices connected in series. In block 1302, the controller may induce a discharge mode in the plurality of energy storage devices connected in series. In determination block 1304 the controller may determine whether there is sufficient power stored in at least one energy storage devices to discharge at a constant discharge current. When the controller determines there is sufficient power stored in at least one energy storage device to discharge at the constant discharge current (i.e. determination block 1304="Yes"), in block 1306 the controller may discharge current at the constant discharge current from the at least one energy storage device and return to determination block 1304.

When the controller determines there is insufficient power stored in at least one energy storage device to discharge at the constant discharge current (i.e. determination block 1304="No"), in determination block 1308 the controller may determine whether at least one energy storage device is below the near depletion threshold. When the controller determines no energy storage device is below the near depletion threshold (i.e. determination block 1308="No"), the controller may return to determination block 1304. When the controller determines at least one energy storage device is below the near depletion threshold (i.e. determination block 1308="Yes"), in block 1310 the controller may independently vary the discharge current of the near depletion energy storage device. In block 1312 the controller may at least partially bypass and/or fully bypass the near depletion energy storage device.

In determination block 1314 the controller may determine whether at least one energy storage device is below the total depletion threshold. When the controller determines that none of the energy storage devices are below the total depletion threshold (i.e. determination block 1314="No"), the controller may return to determination block 1304. When the controller determines that at least one of the energy storage devices is below the total depletion threshold (i.e. determination block 1314="Yes"), in block 1316 the controller may apply a reverse polarity current to the total depletion energy storage device.

In determination block 1318 the controller may determine whether the energy storage devices contain sufficient power to apply a protective current to the totally depleted energy storage devices. When the controller determines that the energy storage devices contain sufficient power to apply a protective current to the total depletion energy storage devices (i.e. determination block 1318="Yes"), the controller may return to determination block 1304. When the controller determines that the energy storage devices do not contain sufficient power to apply a protective current to the total depletion energy storage devices (i.e. determination block 1318="Yes"), in block 1320 the controller may reverse the polarity of the discharge current of the still discharging energy storage devices and return to determination block 1304.

In the method 1300 the repeated implementation of blocks 1306, 1310, 1312, 1316, and 1320 may result in the application of the process of each of the blocks to one or more of the energy storage devices, and during each implementation the energy storage devices may be the same or different energy storage devices of the energy storage and dispensation circuit. Moreover, bypassing, reversing the polarity of, or varying the current of any one energy storage device may be accomplished without correspondingly bypassing, reversing the polarity of, or varying the current of any other energy storage device.

In an alternative embodiment, the order of determination blocks 1308, 1314 and 1318 may be reversed. In this case, the controller first determines whether the energy storage devices contain sufficient power to apply a protective current to the totally depleted energy storage devices in block 1318 and then determines in block 1314 whether at least one energy storage device is below the total depletion threshold. If the answers in blocks 1318 and 1314 are yes, then steps in blocks 1320 and/or 1316 are performed. Finally, if the answer in block 1314 is no, then the controller performs the determination in block 1308 and if the answer is yes, then it performs the steps in blocks 1310 and/or 1312.

The various aspects described above may also be implemented within a variety of other computing devices, such as a laptop computer 1400 illustrated in FIG. 14. Many laptop computers include a touchpad touch surface 1417 that serves as the computer's pointing device, and thus may receive drag, scroll, and flick gestures similar to those implemented on computing devices equipped with a touch screen display and described above. A laptop computer 1400 will typically include a multi-core processor 1411 coupled to volatile memory 1412 and a large capacity nonvolatile memory, such as a disk drive 1413 of Flash memory. Additionally, the computer 1400 may have one or more antenna 1408 for sending and receiving electromagnetic radiation that may be connected to a wireless data link and/or cellular telephone transceiver 1416 coupled to the multi-core processor 1411. The computer 1400 may also include a floppy disc drive 1414 and a compact disc (CD) drive 1415 coupled to the multi-core processor 1411. In a notebook configuration, the computer housing includes the touchpad 1417, the keyboard 1418, and the display 1419 all coupled to the multi-core processor 1411. Other configurations of the computing device may include a computer mouse or trackball coupled to the processor (e.g., via a USB input) as are well known, which may also be use in conjunction with the various aspects. A desktop computer may similarly include these computing device components in various configurations, including separating and combining the components in one or more separate but connectable parts.

The various aspects may also be implemented on any of a variety of commercially available server devices, such as the server 1500 illustrated in FIG. 15. Such a server 1500 typically includes one or more multi-core processor assemblies 1501 coupled to volatile memory 1502 and a large capacity nonvolatile memory, such as a disk drive 1504. As illustrated in FIG. 15, multi-core processor assemblies 1501 may be added to the server 1500 by inserting them into the racks of the assembly. The server 1500 may also include a floppy disc drive, compact disc (CD) or DVD disc drive 1506 coupled to the processor 1501. The server 1500 may also include network access ports 1503 coupled to the multi-core processor assemblies 1501 for establishing network interface connections with a network 1505, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (in which non-privileged code runs) and a kernel space (in which privileged code runs). It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc, wherein disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A circuit, comprising:
   a plurality of switch devices configured to provide for bi-directional flow of a current, wherein each switch device of the plurality of switch devices is electrically connected to at least one other one of the plurality of switch devices in series;
   a plurality of energy storage devices, wherein each energy storage device of the plurality of energy storage devices is electrically connected to at least one of the switch devices such that each energy storage device is electrically connected to at least one of the plurality of energy storage devices in series via at least one of the switch device;
   a direct current to direct current (DC/DC) power converter electrically connected between a power grid connector and each end of a series of the plurality of switch devices, wherein the DC/DC power converter is configured to provide for bi-directional flow of the current; and
   an inductor electrically connected in series between a first end of the series of the plurality of switch devices and a first input/output of the DC/DC power converter.

2. The circuit of claim 1, further comprising a power inverter configured to provide for bi-directional flow of the current, wherein the power inverter is electrically connected in series between the power grid connector and a second input/output of the DC/DC power converter and between the power grid connector and a third input/output of the DC/DC power converter.

3. The circuit of claim 2, further comprising a controller configured to signal each of the plurality of switch devices, the DC/DC power converter, and the power inverter to induce a plurality of states of each of the plurality of switch devices, the DC/DC power converter, and the power inverter individually.

4. The circuit of claim 3, wherein the controller is configured to induce a charging mode of the circuit such that the DC/DC power converter allows the current received at the power grid connector to flow through the inductor to at least one of the plurality of energy storage devices in series, wherein each switch device of the plurality of switch devices is configured to alternate between connecting a respective energy storage device to the circuit for charging and bypassing the respective energy storage device for predetermined time intervals.

5. The circuit of claim 4, wherein the controller is configured to induce each switch device to bypass the respective energy storage device in a sequence through the plurality of switch devices.

6. The circuit of claim 4, wherein the controller is configured to induce each switch device to reverse a polarity of the respective energy storage device for predetermined time intervals in a sequence to pulse plate a metal to electrodes of the respective energy storage device.

7. The circuit of claim 3, wherein the controller is configured to induce an idle mode of the circuit such that the DC/DC power converter prevents current from flowing between the power grid connector and the plurality of energy storage devices in series, wherein each switch device of the plurality of switch devices is configured to connect a respective energy storage device to the circuit.

8. The circuit of claim 3, wherein the controller is configured to induce a discharge mode of the circuit such that the DC/DC power converter allows the current from at least one of the plurality of energy storage devices in series to flow through the inductor to the power grid connector, wherein each switch device of the plurality of switch devices is configured to connect a respective energy storage device to the circuit.

9. The circuit of claim 8, wherein the controller is configured to induce a switch device to at least partially bypass the respective energy storage device in response to a voltage of the respective energy storage device falling below a near depletion threshold.

10. The circuit of claim 9, wherein the controller is configured to lower the current from the respective energy storage device without regulating the voltage of the respective energy storage device.

11. The circuit of claim 9, wherein the controller is configured to induce on out of service mode wherein each switch device is configured to bypass the respective energy storage device in response to the respective energy storage device being out of service.

12. The circuit of claim 8, wherein the controller is configured to induce a switch device to reverse a polarity of the respective energy storage device to provide a protection current to the respective energy storage device from at least one other energy storage device connected in series in response to a voltage of the respective energy storage device falling below a total depletion threshold.

13. The circuit of claim 12, wherein the controller is configured to induce the DC/DC power converter to switch the flow of the current such that the current received at the power grid connector flows through the inductor to at least one of the plurality of energy storage devices in series having a voltage below the total depletion threshold in a strip mode, and to induce each switch device to reverse the polarity of the respective energy storage device having a voltage above the total depletion threshold.

14. The circuit of claim 3, wherein the controller is configured to induce a black start energy mode the circuit such that the DC/DC power converter allows the current from at least one of the plurality of energy storage devices in series to flow through the inductor to the power grid connector, wherein each switch device of the plurality of switch devices is configured to connect a respective energy storage device to the circuit, and wherein the DC/DC power converter regulates the DC voltage of the circuit.

15. The circuit of claim 3, wherein:
   the energy storage devices each comprise a flow battery system with a plurality of cells fluidly connected to an electrolyte reservoir; and the inductor is the only inductor in the circuit connected between the inverter and the plurality of energy storage devices in series.

16. The circuit of claim 3, wherein the controller is configured to:
induce a charging mode of the circuit such that the DC/DC power converter allows the current received at the power grid connector to flow through the inductor to at least one of the plurality of energy storage devices in series, wherein each switch device of the plurality of switch devices is configured to alternate between connecting a respective energy storage device to the circuit for charging and bypassing the respective energy storage device for predetermined time intervals;
induce an idle mode of the circuit such that the DC/DC power converter prevents current from flowing between the power grid connector and the plurality of energy storage devices in series, wherein each switch device of the plurality of switch devices is configured to connect a respective energy storage device to the circuit; and
induce a discharge mode of the circuit such that the DC/DC power converter allows the current from at least one of the plurality of energy storage devices in series to flow through the inductor to the power grid connector, wherein each switch device of the plurality of switch devices is configured to connect a respective energy storage device to the circuit.

17. The circuit of claim 16, wherein the controller is configured:
induce a switch device to at least partially bypass the respective energy storage device in response to a voltage of the respective energy storage device falling below a near depletion threshold;
induce a switch device to reverse a polarity of the respective energy storage device to provide a protection current to the respective energy storage device from at least one other energy storage device connected in series in response to a voltage of the respective energy storage device falling below a total depletion threshold; and
induce the DC/DC power converter to switch the flow of the current such that the current received at the power grid connector flows through the inductor to at least one of the plurality of energy storage devices in series having a voltage below the total depletion threshold in a strip mode, and to induce each switch device to reverse the polarity of the respective energy storage device having a voltage above the total depletion threshold.

18. The circuit of claim 2, wherein the DC/DC power converter comprises:
a discharge boost converter having a first discharge boost converter input/output electrically connected to a first end of the series of the plurality of switch devices via the inductor, and having a second discharge boost converter input/output electrically connected to a second end of the series of the plurality of switch devices and a first power inverter input/output of the power inverter; and
a charge buck converter having a first charge buck converter input/output electrically connected to the first end of the series of the plurality of switch devices via the inductor and the first discharge boost converter input/output, and having a second charge buck converter input/output electrically connected to a second power inverter input/output of the power inverter.

19. The circuit of claim 1, wherein each of the switch devices comprises one of a solid state switch without an inductor, an H-bridge circuit having two phase legs and four switches, and a bridge circuit having one phase leg and two switches.

* * * * *